(12) United States Patent
Luo et al.

(10) Patent No.: US 12,401,930 B2
(45) Date of Patent: Aug. 26, 2025

(54) SERVICE PROTECTION METHOD AND NETWORK NODE

(71) Applicant: Huawei Technologies Co., Ltd., Shenzhen (CN)

(72) Inventors: Xianlong Luo, Wuhan (CN); Gang Xie, Wuhan (CN); Hao Li, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 283 days.

(21) Appl. No.: 18/189,283

(22) Filed: Mar. 24, 2023

(65) Prior Publication Data

US 2023/0232139 A1 Jul. 20, 2023

Related U.S. Application Data

(63) Continuation of application No. PCT/CN2021/118631, filed on Sep. 16, 2021.

(30) Foreign Application Priority Data

Sep. 27, 2020 (CN) .................. 202011032565.X

(51) Int. Cl.
*H04B 10/032* (2013.01)
*H04B 10/038* (2013.01)
(Continued)

(52) U.S. Cl.
CPC ....... *H04Q 11/0066* (2013.01); *H04B 10/032* (2013.01); *H04B 10/038* (2013.01);
(Continued)

(58) Field of Classification Search
CPC .......... H04Q 11/0005; H04Q 11/0066; H04Q 2011/0043; H04Q 2011/0073;
(Continued)

(56) References Cited

U.S. PATENT DOCUMENTS

| | | | |
|---|---|---|---|
| 6,934,248 B1 * | 8/2005 | DeBoer ................... | H04L 45/62 370/221 |
| 7,451,340 B2 | 11/2008 | Doshi et al. | |

(Continued)

FOREIGN PATENT DOCUMENTS

| | | | |
|---|---|---|---|
| CN | 101621475 A | * | 1/2010 |
| CN | 101958809 A | | 1/2011 |
| CN | 113765853 A | * | 12/2021 |

*Primary Examiner* — Li Liu
(74) *Attorney, Agent, or Firm* — Slater Matsil, LLP

(57) ABSTRACT

Embodiments of this application provide a service protection method, including: A first node determines that a fault occurs on a first working path; the first node generates a bandwidth activation message based on the fault, where the bandwidth activation message indicates a third node to adjust a bandwidth of a service from a protection bandwidth to a target bandwidth, the protection bandwidth represents a pre-occupied bandwidth of a first protection path before transmission of the service, and the target bandwidth represents an actual occupied bandwidth for transmission of the service; and the first node sends the bandwidth activation message on the first protection path.

31 Claims, 12 Drawing Sheets

(51) Int. Cl.
*H04J 14/02* (2006.01)
*H04L 41/0896* (2022.01)
*H04Q 11/00* (2006.01)

(52) U.S. Cl.
CPC ...... *H04J 14/0287* (2013.01); *H04J 14/0293* (2013.01); *H04L 41/0896* (2013.01); *H04Q 2011/0009* (2013.01); *H04Q 2011/0043* (2013.01); *H04Q 2011/0075* (2013.01)

(58) Field of Classification Search
CPC ... H04Q 2011/0075; H04Q 2213/13144; H04J 14/0227; H04J 14/0267–0271; H04J 14/0287–0297; H04J 2203/0023; H04J 2203/0051–0053; H04J 2203/0066–0071; H04J 14/0293; H04B 10/032; H04B 10/038; H04L 41/0896
USPC .................................................. 398/1–17, 45
See application file for complete search history.

(56) References Cited

U.S. PATENT DOCUMENTS

| | | | |
|---|---|---|---|
| 2004/0205238 A1* | 10/2004 | Doshi | H04L 41/0663 |
| | | | 709/241 |
| 2005/0185654 A1* | 8/2005 | Zadikian | H04J 14/0297 |
| | | | 370/395.21 |
| 2012/0106956 A1* | 5/2012 | Rao | H04L 45/50 |
| | | | 398/52 |
| 2016/0020850 A1* | 1/2016 | Youn | H04J 3/1652 |
| | | | 398/5 |
| 2017/0318364 A1* | 11/2017 | Lin | H04J 3/1652 |
| 2018/0324505 A1* | 11/2018 | Zheng | H04J 3/14 |
| 2022/0103282 A1* | 3/2022 | Zhang | H04J 3/1664 |
| 2023/0129829 A1* | 4/2023 | Zhang | H04Q 11/0067 |
| | | | 398/52 |

* cited by examiner

FAS: frame alignment signal    OTUk: optical transmission unit k
OH: overhead                   ODUk: optical data unit k
OPUk: optical payload unit k   FEC: forward error correction

SERVICE PROTECTION METHOD AND NETWORK NODE

CROSS-REFERENCE TO RELATED APPLICATIONS

This application is a continuation of International Application No. PCT/CN2021/118631, filed on Sep. 16, 2021, which claims priority to Chinese Patent Application No. 202011032565.X, filed on Sep. 27, 2020. The disclosures of the aforementioned applications are hereby incorporated by reference in their entireties.

TECHNICAL FIELD

The present invention relates to the field of optical network technologies, and in particular, to a service protection method and a network node.

BACKGROUND

With development of optical transmission networks, protection and recovery of an optical transmission network become key concerns in current operations such as design, operation, and maintenance of the optical transmission network. Efficient and flexible protection and recovery methods become an important feature of an optical transmission network.

An automatically switched optical network (ASON) is an optical network that is defined by the International Telecommunication Union (ITU) and based on a distributed control plane, and that supports dynamic switching connections. Currently, ASONs have basically covered WDM networks such as metro networks and core backbone networks. In an ASON, each ASON node uses an open shortest path first (OSPF) protocol to obtain information about other nodes in the entire network, including node data, link data, and the like, then uses a constrained shortest path first (CSPF) algorithm to calculate end-to-end service paths, and finally uses RSVP-TE to establish the end-to-end service paths. In the case of a fiber cut, an end-to-end recovery path can be automatically established through a generalized multi-protocol label switching (GMPLS) and a resource reservation protocol-traffic engineering (RSVP-TE), to provide real-time rerouting protection and recovery capabilities for services.

For a metro/core ASON, real-time rerouting can be performed only after an optical fiber fault occurs in the network. The recovery speed is slow and the recovery time is at the hundreds of milliseconds, for example, 200 ms. Alternatively, a 1+1 dedicated protection group may be configured to implement fast service switching after a network fault occurs. That is, primary 1+1 service path resources are configured to ensure fast service recovery. However, the dedicated 1+1 protection requires twice the resources because the costs are high.

SUMMARY

To accelerate service recovery and reduce resource occupation costs, this application provides a service protection method.

According to a first aspect, this application provides a service protection method, applied to a communication system, where the communication system includes a first node, a second node, and a third node, the first node is a common head node on a first working path and a first protection path, the second node is a common sink node on the first working path and the first protection path, the third node is any node other than the first node and the second node on the first protection path, the first working path is a current communication path of a service, the first protection path is a standby path of the first working path, and the method includes: The first node determines that a fault occurs on the first working path; the first node generates a bandwidth activation message based on the fact that a fault occurs on the first working path, where the bandwidth activation message indicates the third node to adjust a bandwidth of the service from a protection bandwidth to a target bandwidth, the protection bandwidth represents a pre-occupied bandwidth of the first protection path before transmission of the service, and the target bandwidth represents an actual occupied bandwidth for transmission of the service; and the first node sends the bandwidth activation message on the first protection path.

According to the service protection method provided in this application, before a service fault occurs, a virtual connection of a first protection path is established through a protection bandwidth. When a service fault occurs, a head node may simultaneously send a bandwidth activation message along the first protection path to each node on the first protection path, so that end-to-end recovery of the service can be quickly implemented, and only the protection bandwidth is occupied before the service fault occurs, thereby reducing protection costs.

With reference to the first aspect, in a possible implementation, that the first node sends the bandwidth activation message on the first protection path includes: The first node inserts the bandwidth activation message into a payload area of a first data frame; and the first node sends the first data frame on the first protection path. The bandwidth activation message is inserted into the payload area instead of an overhead area of the first data frame, so that costs of obtaining the bandwidth activation message by the node can be reduced, and service recovery can be accelerated.

For example, the first data frame may be an OTN frame, and may be specifically an OPUk frame, an ODUk frame, or an OTUk frame, or may be a flexible data frame, for example, an ODUFlex frame or an optical service unit OSU frame.

With reference to the first aspect, in a possible implementation, the bandwidth activation message further indicates the second node to switch the service to the first protection path. Specifically, it is agreed in a protocol in a network node that when a last node on the protection path receives the bandwidth activation message, the service is automatically switched from the working path to the protection path.

With reference to the first aspect, in another possible implementation, the payload area of the first data frame includes a plurality of optical service units, each of the plurality of optical service units includes a unit overhead area and a unit payload area, and that the first node sends the bandwidth activation message on the first protection path includes:
  the first node inserts the bandwidth activation message into a unit payload area of one or more optical service units; and
  the first node sends the first data frame on the first protection path.

A difference between this implementation and the foregoing implementation lies in that when information is carried through a flexible optical service unit, the bandwidth activation message may be located in a same optical service unit, or may be located in different optical service units. This is not limited in this application.

With reference to the first aspect, in a possible implementation, the payload area of the first data frame further carries an automatic protection switching APS message, and the APS message indicates the second node to switch the service to the first protection path.

With reference to the first aspect, in a possible implementation, the payload area of the first data frame further includes at least one of the following information: a message type and a service ID of the first protection path, where the message type indicates a message carried in the first data frame. In this way, when receiving the first data frame, the node may learn of a frame type of the data frame through the message type. The third node determines, based on the service ID of the first protection path, other services that share a bandwidth of the third node with the service.

With reference to the first aspect, in a possible implementation, the overhead area of the first data frame further includes a signaling type Type field, and the Type field indicates the message type of the first data frame. It should be noted that, this manner and the foregoing manner of carrying the message type in the payload area are two parallel manners of marking the frame type of the first data frame. In specific implementations, one field may be selected to carry the message type.

With reference to the first aspect, in a possible implementation, after the first node sends the bandwidth activation message to the third node on the first protection path, the method further includes: The first node switches the service to the first protection path.

It should be noted that, protection switching is performed after the bandwidth activation message is sent to a downstream node, so that the message can be sent to a peer end of the protection path as soon as possible, and a plurality of nodes can perform bandwidth adjustment in parallel, to implement the protection switching of the service as soon as possible.

With reference to the first aspect, in a possible implementation, after the first node receives a path fault message from the second node, the method further includes: The first node obtains an ID of the service from the path fault message, and determines the service ID of the first protection path of the service based on the ID of the service.

A preset condition of the foregoing implementation is that the first node has stored a correspondence between the ID of the service and the service ID of the first protection path in the node. It should be further noted that, the service ID of the first protection path may be used to determine, based on the service ID of the first protection path when a remaining bandwidth of the downstream node is less than the target bandwidth of the service, whether there is another service that shares a bandwidth of a current node with the current service, and then determine, based on a determining result, whether to perform bandwidth adjustment.

With reference to the first aspect, in a possible implementation, a length of the first data frame is 192 bytes, 240 bytes, 128 bytes, or 64 bytes.

According to a second aspect, this application provides a service protection method, applied to a communication system, where the communication system includes a first node, a second node, and a third node, the first node is a common head node on a first working path and a first protection path, the second node is a common sink node on the first working path and the first protection path, the third node is any node other than the first node and the second node on the first protection path, the first working path is a current communication path of a service, the first protection path is a standby path of the first working path, and the method includes:

The first node receives a path fault message, where the path fault message indicates that a fault occurs on the first working path between the first node and a second node; the first node generates a service protection message based on the path fault message, where the service protection message indicates each node on the first protection path to perform service recovery; and the first node inserts the service protection message into a payload area of a first data frame, and sends the first data frame on the first protection path.

According to the service protection method provided in this aspect, after a fault occurs on a working path of a service, a service protection message is inserted into a payload area of a data frame, so that extraction costs of a node can be reduced, and fast recovery of the service can be implemented.

With reference to the second aspect, in a possible implementation, a service protection message includes a bandwidth activation message and an APS message, and that the service protection message indicates each node on the first protection path to perform service recovery further includes: the bandwidth activation message indicates each node on the first protection path to adjust the bandwidth of the service from the protection bandwidth to the target bandwidth, and the APS message indicates the second node to switch the service to the first protection path.

With reference to the second aspect, in a possible implementation, the payload area of the first data frame further includes at least one of the following information: a protocol packet length, a message type, and the service ID of the first protection path, where the message type indicates that the first data frame is used to adjust the bandwidth of the service from the protection bandwidth to the target bandwidth and perform APS protection switching. In this way, when receiving the first data frame, the node may learn of a frame type of the data frame through the message type.

According to a third aspect, this application provides a service protection method, applied to a communication system, where the communication system includes a first node, a second node, and a third node, the first node is a common head node on a first working path and a first protection path, the second node is a common sink node on the first working path and the first protection path, the third node is any node other than the first node and the second node on the first protection path, the first working path is a current communication path of a service, the first protection path is a standby path of the first working path, and the method includes:

The third node receives a first data frame; the third node obtains a bandwidth activation message from the first data frame, where the bandwidth activation message indicates the third node to adjust a bandwidth of the service from a protection bandwidth to a target bandwidth, the protection bandwidth represents a pre-occupied bandwidth of the first protection path before transmission of the service, and the target bandwidth represents an actual occupied bandwidth for transmission of the service; and the third node adjusts, based on the bandwidth activation message, the bandwidth of the service from the protection bandwidth to the target bandwidth.

According to the service protection method provided in this application, before a service fault occurs, a virtual connection of a first protection path is established through a protection bandwidth. When a service fault occurs, after receiving a bandwidth activation message, a node on the protection path adjusts a bandwidth of the service from the protection bandwidth to a target bandwidth based on the bandwidth activation message, so that end-to-end recovery of the service can be quickly implemented, and only the protection bandwidth is occupied before the service fault occurs, thereby reducing protection costs.

With reference to the third aspect, in a possible implementation, the bandwidth activation message is carried in a payload area of the first data frame. In this way, costs of extracting the bandwidth activation message by the node can be reduced, and fast forwarding of service protection information can be implemented.

With reference to the third aspect, in a possible implementation, the payload area of the first data frame includes a plurality of optical service units, each of the plurality of optical service units includes a unit overhead area and a unit payload area, and the bandwidth activation message is carried in a unit payload area of one or more optical service units.

A difference between this implementation and the foregoing implementation lies in that when information is carried through a flexible optical service unit, the bandwidth activation message may be located in a same optical service unit, or may be located in different optical service units. This is not limited in this application.

With reference to the third aspect, in a possible implementation, the payload area of the first data frame further includes at least one of the following information: a protocol packet length, a message type, a version number, a service ID of the first protection path, and an automatic protection switching APS message, where the message type indicates that the first data frame is used to adjust the bandwidth of the service from the protection bandwidth to the target bandwidth and perform APS protection switching, and the APS message indicates the second node to switch the service to the first protection path.

With reference to the third aspect, in a possible implementation, the overhead area of the first data frame further includes a signaling type Type field, and the Type field indicates the message type of the first data frame.

With reference to the third aspect, in a possible implementation, when a remaining bandwidth of the third node is less than the target bandwidth of the service, the method further includes: The third node determines, based on the service ID of the first protection path, whether there is another service that shares a bandwidth of the third node with the current service; and the third node determines, based on a determining result, whether to perform bandwidth adjustment.

With reference to the third aspect, in a possible implementation, when the third node determines, based on the service ID of the first protection path, that there are N (N≥1) services that share the bandwidth of the third node with the current service, the method further includes:

The third node determines that a sum of the remaining bandwidth and the protection bandwidth*(N+1) is greater than or equal to the target bandwidth; the third node obtains, based on the service ID of the first protection path, IDs of other services that share the bandwidth of the third node with the current service; the third node adjusts, based on the IDs of the other services, a protection bandwidth of at least one of the other services to 0; and the third node adjusts the bandwidth of the current service from the protection bandwidth to the target bandwidth.

Through bandwidth adjustment, when a fault occurs on a working path of a service, bandwidth resources on a protection path can be aggregated to a maximum extent for service recovery.

With reference to the third aspect, in a possible implementation, that the third node receives a first data frame includes: The third node receives an OTN frame from the first node, and demaps the OTN frame to obtain the first data frame.

With reference to the third aspect, in a possible implementation, before the third node adjusts, based on the bandwidth activation message, the bandwidth of the service from the protection bandwidth to the target bandwidth, the method further includes: The third node forwards the bandwidth activation message and the APS message to a downstream node of the third node along the first protection path.

It should be noted that, bandwidth adjustment is performed after the bandwidth activation message and the APS message are sent to the downstream node, so that the message can be sent to a peer end of the protection path as soon as possible, and a plurality of nodes can perform bandwidth adjustment in parallel, to implement the protection switching of the service as soon as possible.

According to a fourth aspect, this application provides a service protection method, applied to a communication system, where the communication system includes a first node, a second node, and a third node, the first node is a common head node on a first working path and a first protection path, the second node is a common sink node on the first working path and the first protection path, the third node is any node other than the first node and the second node on the first protection path, the first working path is a current communication path of a service, the first protection path is a standby path of the first working path, and the method includes: the second node receives a first data frame from the third node, where the first data frame includes a bandwidth activation message, the bandwidth activation message indicates the second node to adjust a bandwidth of the service from a protection bandwidth to a target bandwidth, the protection bandwidth represents a pre-occupied bandwidth of the first protection path before transmission of the service, and the target bandwidth represents an actual occupied bandwidth for transmission of the service; and the second node adjusts the bandwidth of the service from the protection bandwidth to the target bandwidth based on the bandwidth activation message.

According to the service protection method provided in this application, before a service fault occurs, a virtual connection of a first protection path is established through a protection bandwidth. When a service fault occurs, when receiving a bandwidth activation message, a last node on the protection path adjusts a bandwidth of the service from the protection bandwidth to a target bandwidth based on the bandwidth activation message, so that end-to-end recovery of the service can be quickly implemented, and only the protection bandwidth is occupied before the service fault occurs, thereby reducing protection costs.

With reference to the fourth aspect, in a possible implementation, the first data frame further carries an automatic protection switching APS message that indicates the second node to switch the service to the first protection path.

With reference to the fourth aspect, in a possible implementation, the first data frame includes a first overhead, a path fault message is located in the first overhead, and/or a second data frame includes a payload area, and the bandwidth activation message and/or the APS message is located in the payload area.

According to a fifth aspect, this application provides a network node, including: a determining unit, configured to determine that a fault occurs on a first working path; a processing unit, configured to generate a bandwidth activation message based on the fault, where the bandwidth activation message indicates a third node to adjust a bandwidth of a service from a protection bandwidth to a target bandwidth, the protection bandwidth represents a pre-occupied bandwidth of a first protection path before transmission of the service, the target bandwidth represents an actual occupied bandwidth for transmission of the service, the third node is any node other than the first node and a second node on the first protection path, and the second node is a sink node on the first protection path; and a sending unit, configured to send the bandwidth activation message on the first protection path.

With reference to the fifth aspect, in a possible implementation, the first data frame further carries an automatic protection switching APS message that indicates the network node to switch the service to the first protection path.

With reference to the fifth aspect, in a possible implementation, the processing unit is further configured to insert the bandwidth activation message and the APS message into a payload area of a first data frame, and the sending unit is further configured to send the first data frame on the first protection path.

With reference to the fifth aspect, in a possible implementation, a length of the first data frame is 192 bytes, 240 bytes, 128 bytes, or 64 bytes.

With reference to the fifth aspect, in a possible implementation, the payload area of the first data frame further includes at least one of the following information: a protocol packet length, a message type, a version number, and a service ID of the first protection path, where the message type indicates information carried in the first data frame.

With reference to the fifth aspect, in a possible implementation, after the sending unit sends the first data frame to the third node, the processing module is further configured to switch the service to the first protection path.

According to a sixth aspect, this application provides a network node, including: a receiving unit, configured to receive a first data frame; an obtaining unit, configured to obtain a bandwidth activation message from the first data frame, where the bandwidth activation message indicates the network node to adjust a bandwidth of a service from a protection bandwidth to a target bandwidth, the protection bandwidth represents a pre-occupied bandwidth of a first protection path before transmission of the service, and the target bandwidth represents an actual occupied bandwidth for transmission of the service; and a configuration unit, configured to adjust, based on the bandwidth activation message, the bandwidth of the service from the protection bandwidth to the target bandwidth.

With reference to the sixth aspect, in a possible implementation, a length of the first data frame is 192 bytes, 240 bytes, 128 bytes, or 64 bytes.

With reference to the sixth aspect, in a possible implementation, the payload area of the first data frame includes a plurality of optical service units, each of the plurality of optical service units includes a unit overhead area and a unit payload area, and the bandwidth activation message is located in a unit payload area of one or more optical service units.

With reference to the sixth aspect, in a possible implementation, the payload area of the first data frame further includes at least one of the following information: a protocol packet length, a message type, a version number, a service ID of the first protection path, and an automatic protection switching APS message, where the message type indicates that the first data frame is used to adjust the bandwidth of the service from the protection bandwidth to the target bandwidth and perform APS switching, and the APS message indicates the network node to switch the service to the first protection path.

With reference to the sixth aspect, in a possible implementation, when a remaining bandwidth of the network node is less than the target bandwidth of the service, the configuration unit is further configured to: determine, based on the service ID of the first protection path of the service, whether there is another service that shares the bandwidth of the network node with the current service; and determine, based on a determining result, whether to perform bandwidth adjustment.

With reference to the sixth aspect, in a possible implementation, when the network node determines, based on the service ID of the first protection path, that there are N (N≥1) services that share the bandwidth of the network node with the current service, the configuration unit is further configured to:

determine that a sum of the remaining bandwidth and the protection bandwidth*(N+1) is greater than or equal to the target bandwidth;

obtain, based on the service ID of the first protection path of the service, IDs of other services that share the bandwidth of the network node with the current service;

adjust, based on the IDs of the other services, a protection bandwidth of at least one of the other services to 0, to release an idle bandwidth; and adjust, based on the remaining bandwidth and the idle bandwidth, the bandwidth of the current service from the protection bandwidth to the target bandwidth.

According to a seventh aspect, this application provides a network node, including:
 a receiving unit, configured to receive a first data frame, where the first data frame includes a bandwidth activation message, and the bandwidth activation message indicates the network node to adjust a bandwidth of a service from a protection bandwidth to a target bandwidth; and
 a processing unit, configured to adjust, based on the bandwidth activation message, the bandwidth of the service from the protection bandwidth to the target bandwidth.

With reference to the seventh aspect, in a possible implementation, the first data frame further carries an APS message, and the APS message indicates the network node to switch the service to the first protection path.

With reference to the seventh aspect, in a possible implementation, the bandwidth activation message and the APS message are carried in a payload area of the first data frame.

According to an eighth aspect, this application provides a communication device, including a processor and a memory. The memory is configured to store a computer program or instructions, and when the computer program or the instructions are executed on the processor, any one of the first aspect and the possible implementations of the first aspect is performed, or any one of the second aspect and the possible implementations of the second aspect is performed, or any one of the third aspect and the possible implementations of the third aspect is performed.

According to a ninth aspect, this application provides a computer-readable storage medium, storing a computer program or instructions, and the computer program or the instructions are used to implement any one of the first aspect and the possible implementations of the first aspect, or any one of the second aspect and the possible implementations of the second aspect, or any one of the third aspect and the possible implementations of the third aspect.

According to a tenth aspect, this application provides a computer program product, including a computer program. When the computer program is run, a computer is enabled to perform any one of the first aspect and the possible implementations of the first aspect, or perform any one of the second aspect and the possible implementations of the second aspect, or perform any one of the third aspect and the possible implementations of the third aspect.

According to the service protection method, the related network node, and the related network device provided in this application, before a service fault occurs, a virtual connection of a first protection path is established through a protection bandwidth. When a service fault occurs, a head node may send a bandwidth activation message along the first protection path to each node on the first protection path, and each node separately implements service bandwidth adjustment based on the bandwidth activation message, so that end-to-end recovery of the service can be quickly implemented, and only the protection bandwidth is occupied before the service fault occurs, thereby reducing protection costs.

BRIEF DESCRIPTION OF THE DRAWINGS

To describe the technical solutions in embodiments of this application or in the background more clearly, the following describes the accompanying drawings for describing embodiments of this application or the background.

DETAILED DESCRIPTION OF ILLUSTRATIVE EMBODIMENTS

The technical solutions in embodiments of this application may be applied to an ASON. For ease of understanding the technical solutions in embodiments of this application, the following briefly describes some terms and technologies used in embodiments of this application.

1. Node

A node is used to represent an independent hardware entity in a network, and is generally a transport network device. For example, in FIG. 1, there are four nodes: a node 1, a node 2, a node 3, and a node 4.

Figure 1:
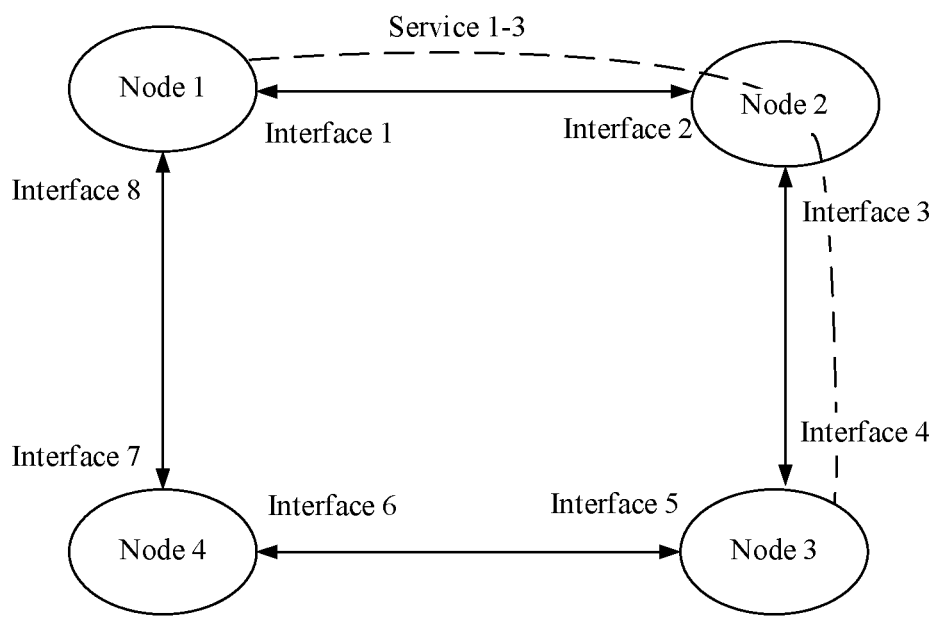
FIG. 1 is a schematic diagram of an ASON architecture according to an embodiment of this application.

It should be understood that the ASON shown in FIG. 1 is merely an example, and does not constitute any limitation on the protection scope of this application. The ASON may include more than four nodes, or may include two or more nodes.

2. Interface

An interface is a physical port on a node that is configured to send and receive a network protocol message and traffic data. For example, in FIG. 1, there are eight interfaces: an interface 1, an interface 2, an interface 3, an interface 4, an interface 5, an interface 6, an interface 7, and an interface 8. The interface #1 and the interface #8 are physical ports of the node #1, the interface #2 and the interface #3 are physical ports of the node #2, the interface #4 and the interface #5 are physical ports of the node #3, and the interface #6 and the interface #7 are physical ports of the node #4.

3. Link

In embodiments of this application, a connection between two adjacent nodes is referred to as a link. A link may be indicated by a link (node-interface, node-interface). Whether a link exists between two adjacent nodes may indicate whether information such as a network protocol message and/or traffic data can be forwarded between the two adjacent nodes. For example, if a link exists between two adjacent nodes, information such as a network protocol message and/or traffic data can be forwarded between the two adjacent nodes. Similarly, if no link exists between two adjacent nodes, information such as a network protocol message and/or traffic data cannot be forwarded between the two adjacent nodes.

For example, a link (node 1-interface 1, node 2-interface 2) indicates that information such as a network protocol message and/or traffic data can be received on the node 2 and the interface 2 after being sent from the interface 1 of the node 1.

The ASON shown in FIG. 1 has eight links: a link 1-2 (node 1-interface 1→node 2-interface 1), a link 1-4 (node 1-interface 8→node 4-interface 7), a link 2-1 (node 2-interface 2→node 1-interface 1), a link 2-3 (node 2-interface 3→node 3-interface 4), a link 3-2 (node 3-interface 4→node 2-interface 3), a link 3-4 (node 3-interface 5→node 4-interface 6), a link 4-3 (node 4-interface 6→node 3-interface 5), and a link 4-1 (node 4-interface 7→node 1-interface 8).

4. Service

A service indicates that a physical channel connection is established between two nodes. Data traffic can be sent from a source node and received on a sink node. For example, a service 1-3 exists in FIG. 1, indicating that a data channel that can be connected exists between the node 1 and the node 3.

The ASON can provide fast end-to-end establishment, query, deletion, attribute modification, and recovery functions for a service through an RSVP-TE protocol. A network management system issues a service creation command to a source node network element. The source node network element implements route calculation and initiates a service configuration process through the RSVP-TE signaling protocol. Cross-connections are established node by node from the source node to a downstream node, to complete creation of services. This manner fully uses routing and signaling functions of each network element and shortens the time for configuring services. For example, as shown in FIG. 1, service 1-3 signaling RSVP-TE path establishment includes the following steps: A source node 1 calculates a service path through Constrained Shortest Path First (CSPF): node 1-node 2-node 3. Along the calculated path, the source node carries end-to-end path information, and specifies a link 1-2 interface to send a Path message (a type of RSVP-TE protocol packet) to an intermediate node 2. After receiving the signaling message, the node 2 decodes cross-connection configuration association information of the local node and establishes a reverse cross-connection. The intermediate node 2 carries the end-to-end path message and specifies a link 2-3 interface to send a Path message to a sink node 3. Similarly, the sink node 3 decodes the corresponding cross-connection configuration message and establishes a reverse cross-connection of the local station. The sink node 3 sends a Resv message (a type of RSVP-TE protocol packet) to the source node 1 through the intermediate node 2, and establishes a forward cross-connection at each node along the path. In the same process, the source node 1 sends a Path message to the sink node 3 through the intermediate node 2, and enables alarm monitoring on the service along the path. The sink node 3 sends the Resv message to the source node 1 through the intermediate node 2 for acknowledgment. In the entire process, RSVP-TE signaling automatically completes the end-to-end configuration establishment of the service 1-3.

In a static network, establishment of a service is performed by a network management system to manually establish, delete, query, and modify attributes of a single station, and end-to-end automation is not supported. As shown in FIG. 1, to establish the service 1-3 by the network management system, a service path node 1-node 2-node 3 needs to be manually planned first, and single-station cross-connections are configured node by node. After cross-connections are configured on all nodes, end-to-end establishment of the service 1-3 is completed. The entire process requires manual configuration for a single station separately to establish services. The efficiency is low.

5. Service Path

A service path may include a working path, a recovery path, a protection path, and the like, and is used to carry data transmission of a service. The service path is a route between a head node and a last node. One or more nodes may exist between the head node and the last node. The head node on the service path represents a sending node of service data, and the last node on the service path represents a receiving node of the service data. A service path may be represented by a service (head node-last node).

The service path indicates a route from a head node to a last node, and may also be referred to as an end-to-end service path, where "end-to-end" indicates from the head node to the last node.

In addition, the ASON can provide end-to-end establishment, query, deletion, attribute modification, and recovery functions for a service path through the RSVP-TE protocol. The end-to-end establishment of a service path includes: The network management system issues a service path creation command to a head node. The head node computes a route and initiates a service path configuration process through the RSVP-TE signaling protocol. Cross-connections are established node by node from the head node to a downstream node. In this way, the end-to-end establishment of the service path is completed.

The service path in this application includes both a working path and a protection path. The switching of the service path may indicate that the service is switched from the working path to the protection path, or indicate that the service is switched back from the protection path to the working path.

6. Flexible Optical Service Unit Frame

Optical transport network (OTN) has become a mainstream technology used in transport networks due to features such as high bandwidth, large capacity, high reliability, and low latency. The OTN can be applied to backbone, metro core, and aggregation networks, and can be further extended to access networks. A data frame structure used in the OTN is an OTN frame, and the OTN frame may also be referred to as an OTN transmission frame. OTN frames are used to carry various service data and provide various management and monitoring functions. In addition to providing high-bandwidth transmission capabilities such as n*1.25 Gbit/s and n*5 Gbit/s, the OTN needs to provide a transmission capability of several megabits per second in the future.

Based on the conventional OTN frame structure, liquid OTN introduces a flexible service-oriented container, namely, flexible optical service unit (OSUflex) frame. The flexible pipe bandwidth (for example, n*2.4 Mbit/s, where n indicates a quantity of pipes) is defined to efficiently carry small-granularity signals. The OSUflex changes an original encapsulation size, and can be directly mapped to a higher order optical channel data unit-k (ODUk) pipe, where k represents a different rate level. For example, k=1 represents 2.5 Gbps, and k=4 represents 100 Gbps.

Figure 2:
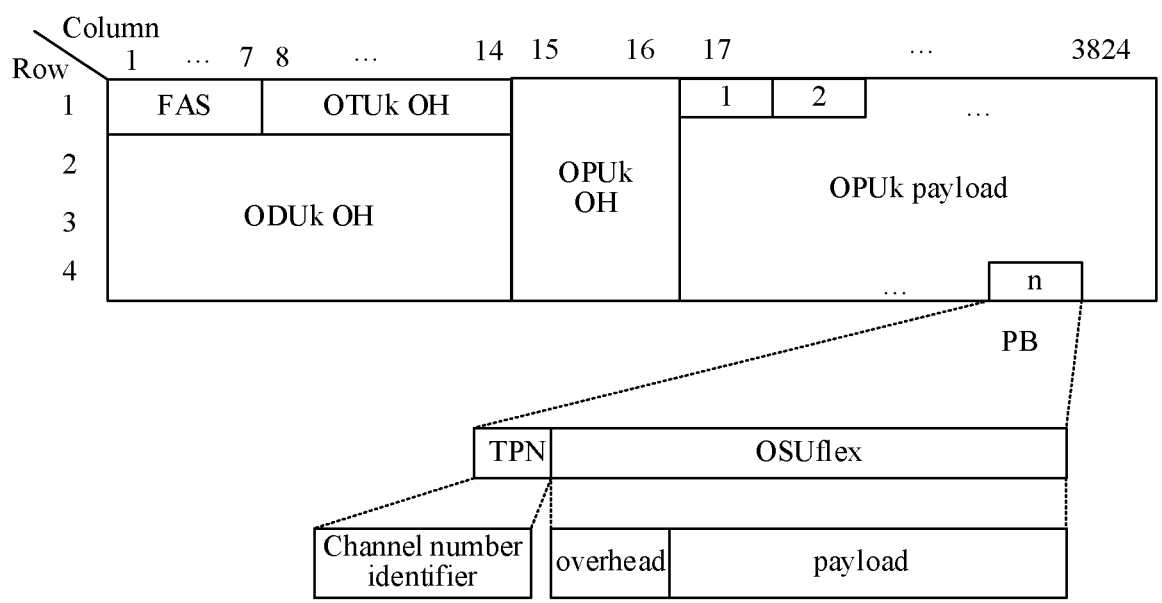
FIG. 2 is a schematic diagram of a structure of an OSU frame according to an embodiment of this application.

In embodiments of this application, the OTN frame may be an OSUflex frame, and the OSUflex frame may also be referred to as an OSU frame for short. FIG. 2 is a schematic diagram of a structure of an OSU frame according to an embodiment of this application. As shown in FIG. 2, an optical payload unit-k (OPUk) frame or an OPUflex frame is divided into a plurality of payload blocks (PB), and each PB includes an OSU frame and an index number TPN corresponding to the OSU frame. When a plurality of OSU frames are mapped to an OPUk/Flex frame, TPNs may be used as unique channel identifiers of the OSU frames at a server layer. Each OSU frame includes two parts: an overhead area and a payload area. The overhead area includes but is not limited to overhead information such as a signaling type, a version identifier, and a check bit, and the payload area is used to carry service data information. A length of an OSU frame is generally a fixed size, for example, the length is 192 bytes, 240 bytes, 128 bytes, or 64 bytes.

The following further describes the technical solutions in embodiments of this application with reference to the accompanying drawings in embodiments of this application. In description of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in descriptions of this application, unless otherwise specified, "a plurality of" means two or more than two. In addition, to clearly describe the technical solutions in embodiments of this application, terms such as first and second are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

The network architecture and the service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems.

Figure 3:
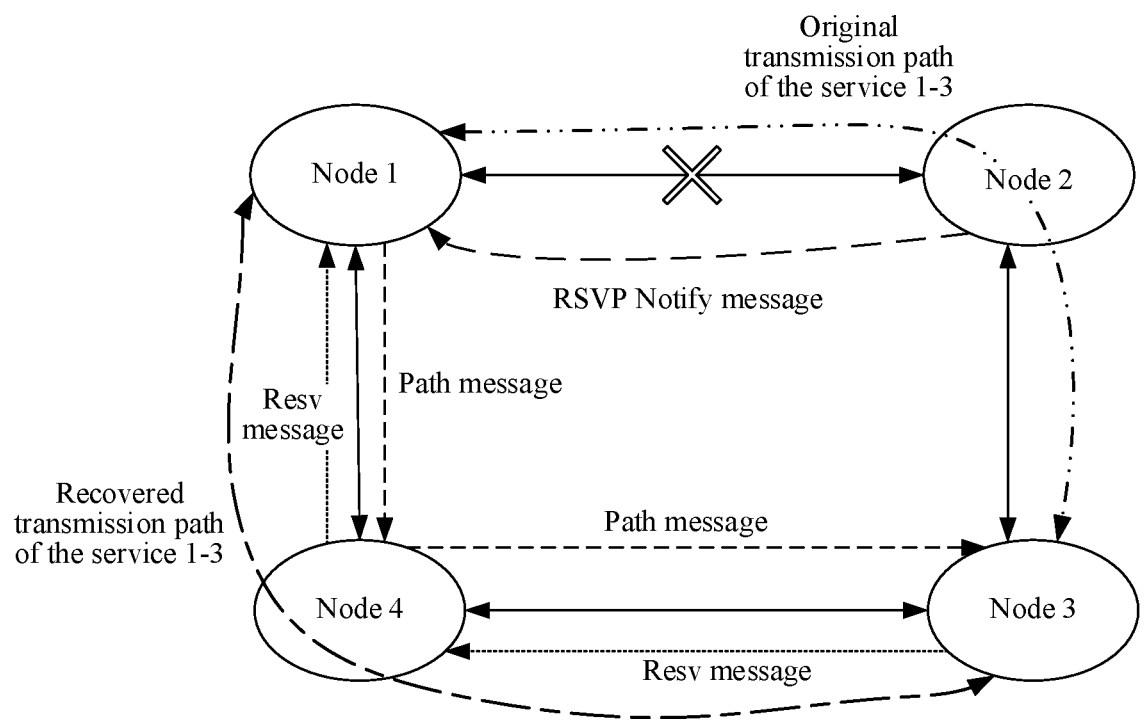
FIG. 3 is a schematic diagram of a service recovery method.

FIG. 3 is a schematic diagram of service path recovery. Nodes can automatically recover end-to-end service paths through the RSVP-TE protocol.

As shown in FIG. 3, an original service path of the service 1-3 automatically established for the service 1-3 through the RSVP-TE is: node 1-node 2-node 3, where the original service path may also be referred to as a working path. If an optical fiber cut occurs between the node 1 and the node 2, the end-to-end automatic recovery of the service path through the RSVP-TE protocol includes:

The node 2 perceives fault alarm information, matches and finds the affected service 1-3 based on port alarm information carried in the fault alarm information, and then notifies the head node (node 1) of the affected service 1-3 of the fault information through an RSVP notify message.

It should be noted that, in this embodiment of this application, how the node 2 perceives the fault alarm information is not limited. For example, after an optical fiber between the node 1 and the node 2 is cut (for example, an optical fiber in a direction from the node 1 to the node 2 is cut, or an optical fiber in a direction from the node 2 to the node 1 is not cut), a bottom layer of the node 2 perceives the optical fiber cut (for example, perceives an information transmission interruption). In addition, in this embodiment of this application, how the node 2 transmits the RSVP notify message to the node 1 is not limited. For example, the RSVP notify message may be transmitted to the node 1 through the optical fiber in the direction from the node 2 to the node 1, or through another path when the optical fiber in the direction from the node 2 to the node 1 is also broken.

After receiving the RSVP notify message, the node 1 learns of the affected service 1-3 through the fault information, and automatically determines a recovery path (node 1-node 4-node 3 shown in FIG. 2) that can continue to implement the service 1-3. The nodes in the ASON then use RSVP-TE signaling (path and Resv messages) to establish cross-connections hop by hop along the service recovery path (node 1-node 4-node 3) and automatically establish an end-to-end recovery path. After the recovery path is established, service 1-3 is automatically recovered.

Figure 4:
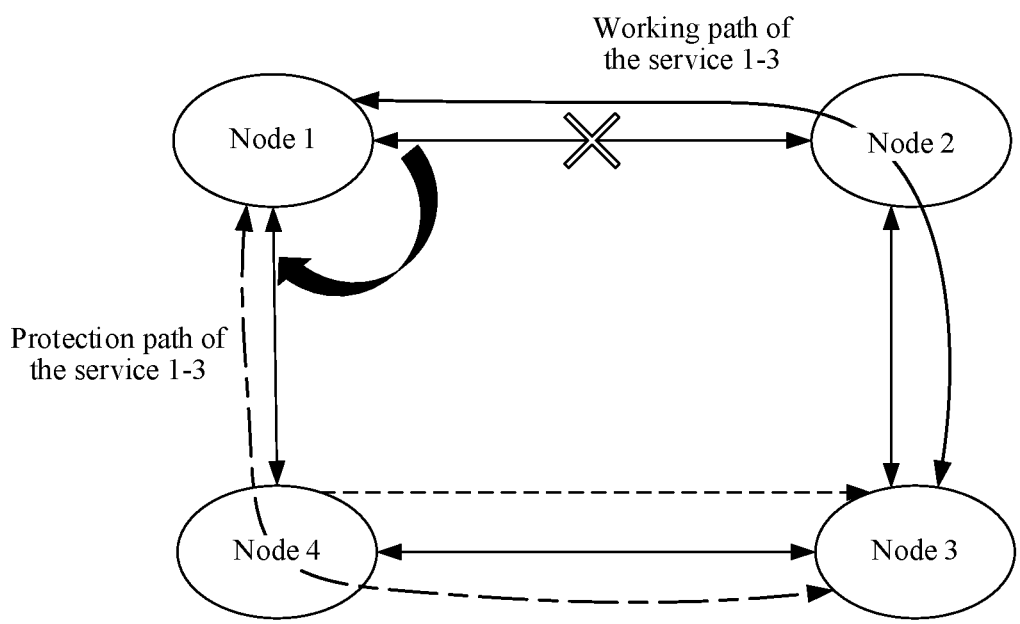
FIG. 4 is a schematic diagram of another service recovery method.

FIG. 4 is a schematic diagram of another service path recovery. A 1+1 dedicated protection group is configured between the node 1 and the node 4 to implement fast service switching when a network fault occurs.

As shown in FIG. 4, a working path: node 1-node 2-node 3 and a protection path: node 1-node 4-node 3 of the service 1-3 are respectively established for the service 1-3 through the RSVP-TE. The head node 1 of the service 1-3 sends two channels of service information through the working path and the protection path, and selectively receives one channel of service information at the last node 3, for example, selectively receives service data on the working path. Fault statuses of the working path and the protection path are detected through a dedicated overhead of the protection group protocol. When a fault occurs on the link between the node 1 and the node 2, the node 1 or the node 3 quickly perceives the fault and initiates fast switching of the current node protection group to switch the service 1-3 from the working path to the protection path.

It should be noted that, service path recovery may also be understood as service recovery, because after a service path is recovered, transmission of a service carried on the service path can also be correspondingly recovered.

In the service recovery method shown in FIG. 2 and FIG. 3, for a metro/core ASON, in FIG. 2, real-time rerouting can be performed for service recovery only after a fault occurs on an optical fiber in the network. The performance is low. In the recovery method shown in FIG. 3, although service recovery can be performed through an established protection path, protection costs are high, and two times of resources need to be occupied.

To improve service recovery performance of the network and reduce costs, this application provides a service recovery method and a network node. In the service recovery method, shared protection segments of different services are established between network nodes, to implement fast recovery of a faulty service and reduce costs.

Figure 5:
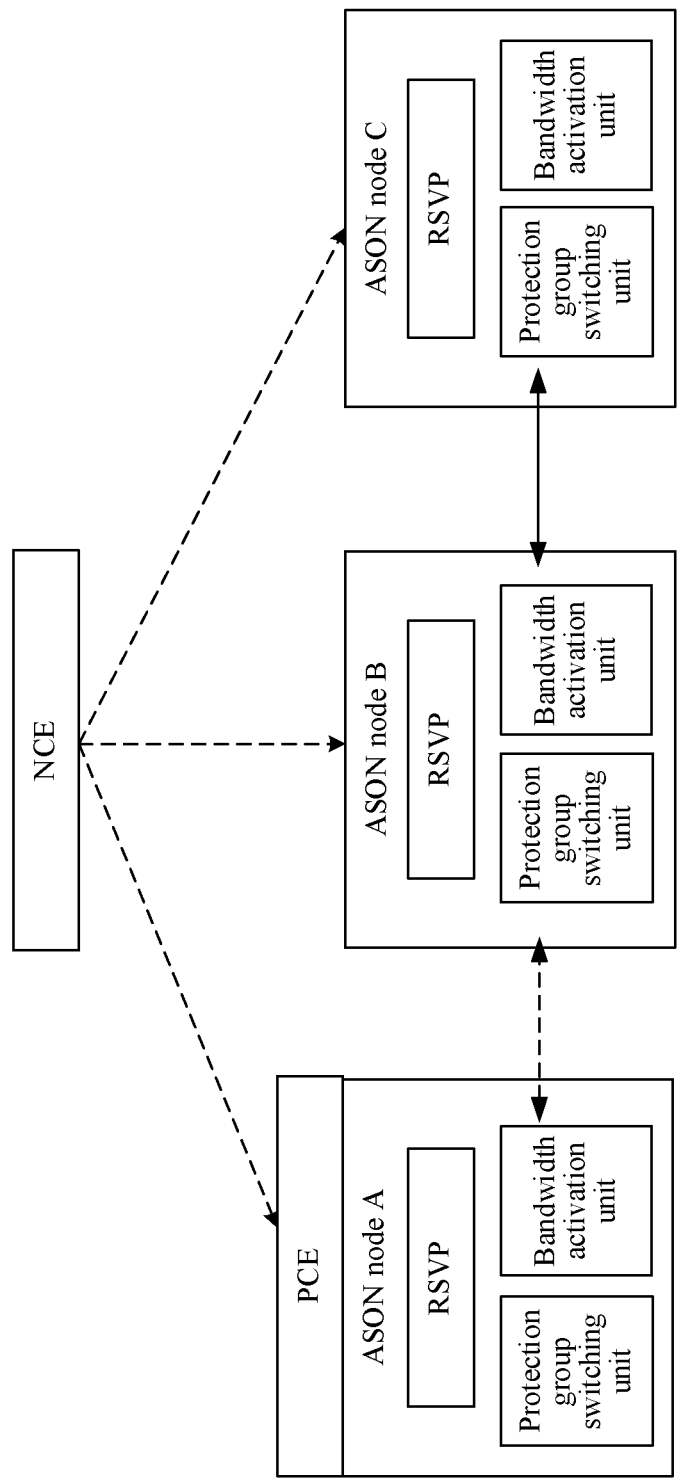
FIG. 5 is a schematic diagram of a node configuration of an ASON according to an embodiment of this application.

FIG. 5 is a schematic diagram of a node configuration of an ASON according to an embodiment of this application. As shown in FIG. 5, the architecture includes a network cloud engine (NCE), a node A, a node B, and a node C. An Resource Reservation Protocol (RSVP) control unit, a protection group switching unit, and a bandwidth activation unit are deployed on each node.

The ASON architecture further includes a network device used for path computation. For example, the network device includes a path computation element (PCE) controller, that is, at least one PCE controller is disposed in the ASON. Alternatively, the network device is a node having a path computation function. For example, a PCE controller is deployed on at least one node in the ASON. For another example, a path computation function module is deployed on at least one node in the ASON.

NCE is used for automatic service provisioning and deletion.

When the node A is a service head node, the node A may include a PCE controller. The PCE controller is configured to: calculate a shared protection path of the service based on a bandwidth sharing policy; manage a life cycle of the shared protection path, for example, configure, delete, or update the life cycle; and configure a service relationship of a plurality of protection paths of a shared bandwidth.

The RSVP control unit is configured to establish, delete, update, and re-establish the shared protection path of the service, and is also used to maintain the end-to-end shared protection path.

The protection group switching unit is configured to switch the protection group to a standby protection path quickly after the service head node or last node perceives that a fault occurs on the working path of the service.

The bandwidth activation unit is configured to: after perceiving the fault of the working path, the service head node finds a corresponding service ID, and generates channel associated signaling including the service ID, to perform bandwidth activation of the end-to-end protection path; and a service intermediate node performs centralized bandwidth decision processing based on the received channel associated signaling, to activate and configure a target bandwidth of the service.

It should be noted that, the channel associated in this application indicates that the cross-connection of the protection path of the service has been established before the service is provisioned. Therefore, when a fault occurs on the working path of the service, a protection path head node (or a protection segment head node) transmits the signaling for bandwidth activation to a protection path sink node (or a protection segment sink node) along the protection path, that is, the channel for which the cross-connection has been established. Because the channel is a dedicated channel of the faulty service, only bandwidth activation information needs to be carried without the service ID. This process is referred to as channel associated transmission of signaling. What needs to be distinguished from the channel associated transmission of signaling is common channel transmission of signaling. The common channel transmission of signaling refers to transmission of signaling for recovering a service in a channel shared by a plurality of services. Therefore, to enable a target node to accurately identify the service that needs to be recovered, the signaling needs to carry an ID of the service that needs to be recovered.

It should be understood that FIG. 5 is merely a schematic diagram provided for ease of understanding of this application, and does not constitute any limitation on the protection scope of this application. Names of the foregoing units are merely examples, and other units or modules that can implement a same function replace the units shown in FIG. 5.

Figure 6:
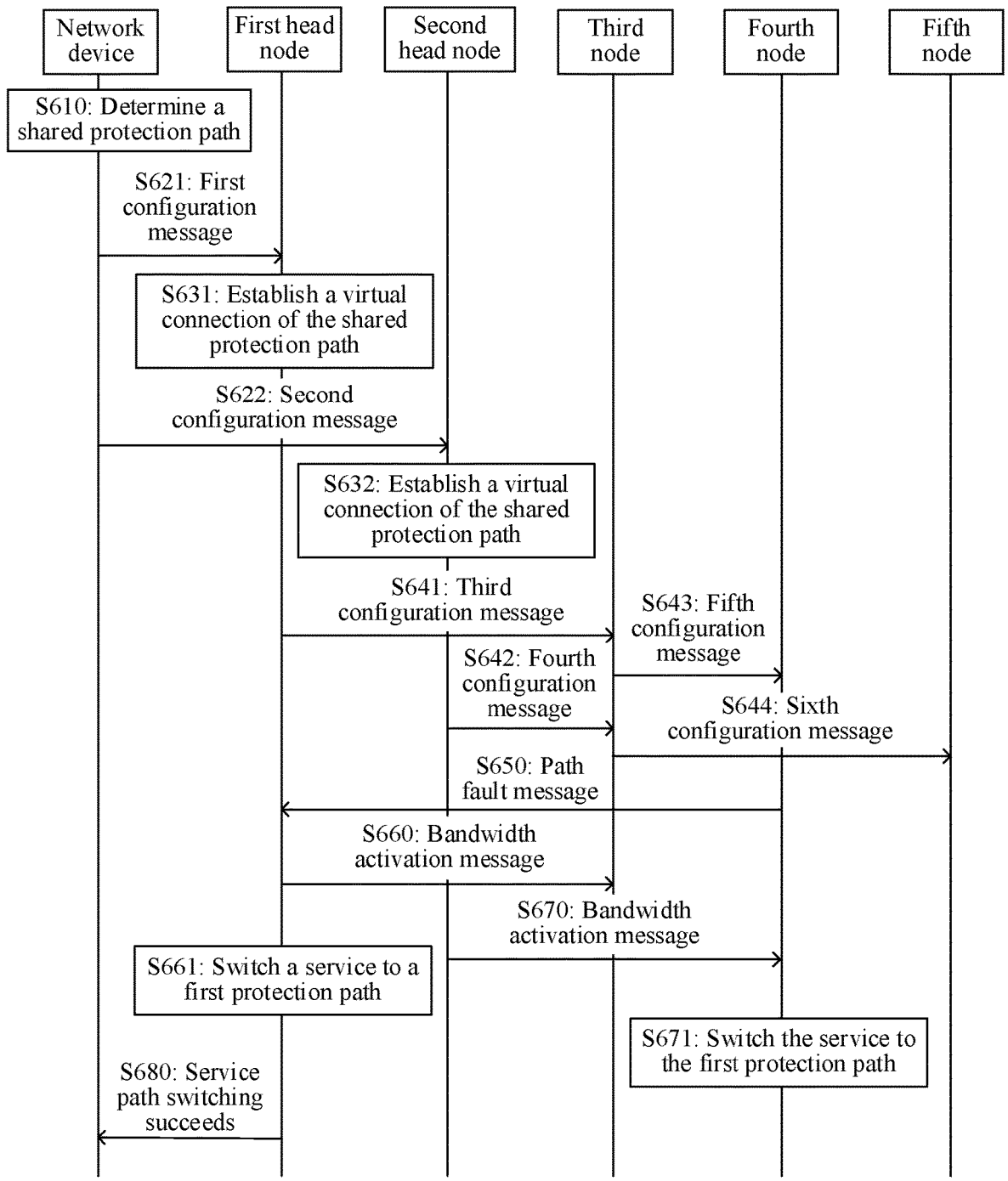
FIG. 6 is a system sequence diagram of a service protection method according to an embodiment of this application.

FIG. 6 is a system sequence diagram of a service protection method according to an embodiment of this application. The method may be applied to an ASON. The network may include a plurality of nodes shown in FIG. 5.

In this embodiment of this application, an example in which shared protection is performed on two services (a first service and a second service) through an OSU frame is used for description. In this embodiment of this application, a node having a path computation function and a PCE controller are collectively referred to as a network device, the first service is carried on a first working path, a head node on the first working path is referred to as a first head node, the second service is carried on a second working path, and a head node on the second working path is referred to as a second head node. It should be noted that, the network device may be a head node of the first service, or the network device may be a head node of the second service.

It should be further noted that, the first working path and the second working path may be the same working path. In other words, the working path carries a plurality of services. In addition, the first recovery path corresponding to the first working path and the second recovery path corresponding to the second working path may also be a same recovery path. The recovery path may recover a plurality of services carried on either working path.

The service protection method in FIG. 6 includes at least all or some of the following steps.

S610: The network device determines a shared protection path.

Specifically, the network device determines a first protection path of the first working path and a second protection path of the second working path, where the first protection path is used to perform service protection switching for the first working path when a fault occurs on the first working path, and the second protection path is used to perform service protection switching for the second working path when a fault occurs on the second working path. The first protection path and the second protection path have a same protection path segment.

In this embodiment of this application, the network device can obtain a service and a topology in a network, determine, based on a faulty link sharing protection policy, a protection path corresponding to a working path that carries a service, and bind and associate a plurality of services having a same protection path segment through a service group ID. The service group ID identifies the plurality of services having the same protection path segment, or identifies a plurality of service paths having a same protection path segment. The ID in this embodiment may be understood as identification information, and is used to identify a service or a path used to carry the service. The identification information may also be referred to as index information or indication information, and is referred to as ID below for ease of description.

The faulty link sharing protection policy means that when the network device determines, on a premise that a fault occurs on a link in the network, protection paths respectively corresponding to working paths affected by the faulty link, the plurality of protection paths have a same protection path segment as much as possible.

The same protection path segment in this embodiment of this application is a common path segment or an overlapping path segment of the first protection path and the second protection path, or may be understood as an overlapping protection path segment, a shared protection path segment, or the like, and is referred to as a protection path segment for short below. In addition, the first protection path and the second protection path have the same protection path segment, where the same protection path segment may be a part of path segments of the first protection path or the second protection path, or may be all path segments of the first protection path or the second protection path.

A specific reason why a fault occurs on the working path is not limited in this embodiment of this application. That a fault occurs on the first working path may be that a fault occurs on one or more links in the first working path, a fault occurs on a node on the first working path, or a fault occurs in an interface of a node on the first working path. Similarly, that a fault occurs on the second working path includes that a fault occurs on one or more links in the second working path, a fault occurs on a node on the second working path, or a fault occurs in an interface of a node on the second working path.

It should be noted that, the path in embodiments of this application is directional. The first working path and the first protection path are both unidirectional paths that use the first head node as a first service sending node, and that a fault occurs on the first working path means that a fault occurs on the unidirectional path. Similarly, the second working path and the second protection path are unidirectional paths that use the second head node as a second service sending node, and that a fault occurs on the second working path means that a fault occurs on the unidirectional path.

The shared protection described in this embodiment may include the following cases: (1) 1:N sharing of services at a same rate, that is, one bandwidth resource is shared by N services at a same rate. For example, N services at a rate of 100 M share 100 M bandwidth. (2) 1:N sharing of services at different rates, that is, one bandwidth resource is shared by N services at different rates. For example, three services at rates of 50 M, 70 M, and 100 M respectively share 100 M bandwidth. (3) M:N sharing of services at a same rate, M<N, that is, M bandwidth resources are shared by N services at the same rate. For example, ten 100 M services share seven 100 M bandwidth resources. (4) M:N sharing of services at different rates, M<N, that is, M bandwidth resources are shared by N services at different rates. For example, three services at rates of 50 M, 70 M, and 100 M respectively share 100*2=200 M broadband resources.

S620: The network device delivers a configuration message to a head node.

Specifically, this step includes: The network device delivers a first configuration message to the first head node S621. The first configuration message includes routing information of the first protection path, and may further include whether the protection path segment of the first protection path is shared, a sharing degree, and a service group ID. Similarly, this step further includes: The network device delivers a second configuration message to the second head node S622. The second configuration message includes routing information of the second protection path, whether the protection path segment is shared, a sharing degree, and a service group ID. The sharing degree indicates how many services share the protection path segment, and the service group ID indicates a plurality of services that share the protection path segment. In this embodiment of this application, an example in which the protection path segment is shared by the first service and the second service and the sharing degree is 2 is used for description.

For example, the first configuration message may be a path computation element communication protocol (PCEP) message, or the first configuration message may be a protocol message that has a same function as the PCEP. For example, the first configuration message may be implemented through a newly added field (for example, an extended PCEP field) in original signaling between the network device and the first head node.

For example, the second configuration message may be a PCEP message, or the second configuration message may be a protocol message that has a same function as the PCEP. For example, the second configuration message may be implemented through a newly added field (for example, an extended PCEP field) in original signaling between the network device and the second head node.

In this embodiment of this application, the network device may further notify a third node of the first configuration message, and notify the third node of the second configuration message. The third node is a head node of the protection path segment. Specifically, based on the identity of the network device in the network, the following manners are available:

Manner 1: The Network Device is a PCE

The network device is a PCE controller disposed in the network, and the PCE controller is a device deployed independent of the head nodes of the working paths and the head and last nodes of the protection path segment.

Therefore, in manner 1, after the network device generates the first configuration message and the second configuration message, the first configuration message needs to be notified to the first head node, and the second configuration message needs to be notified to the second head node.

The first configuration message includes routing information of the first protection path, and may further include whether the protection path segment of the first protection path is shared, a sharing degree, and a service group ID. The second configuration message includes routing information of the second protection path, whether the protection path segment is shared, a sharing degree, and a service group ID.

For example, the first configuration message may be one message or may be a general term of a plurality of messages, that is, the routing information, share group information, and the service group ID of the first protection path may be sent to the first head node through one message, or may be sent to the first head node through a plurality of messages. Similarly, the second configuration message may be one message or may be a general term of a plurality of messages, that is, the routing information, share group information, and the service group ID of the second protection path may be sent to the second head node through one message, or may be sent to the second head node through a plurality of messages.

In this embodiment, the first configuration message and the second configuration message may be referred to as extended TLV information. The TLV is a variable format, which means: type, length, and value, where the type field is information about a label and an encoding format, the length field is a length of a defined value, and the value field indicates an actual value. Lengths of the type field and the length field are generally fixed, for example, two or four bytes.

Packet formats of the first configuration message and the second configuration message in this application may be shown as follows:

```
PCEP<Path Message>::=
    <Common Header>
    <MESSAGE-ID>
    <HOP object>
```

Newly added<share group information>TLV "Under the HOP object, the newly added share group information may include: whether to share, a sharing degree, and a shared service group ID"

A message format of the share group information is shown in Table 1. Table 1 shows a message format of share group information according to an embodiment of this application. Descriptions and values of fields included in Table 1 are shown in Table 2.

TABLE 1

```
       0                   1                   2                   3
       0 1 2 3 4 5 6 7 8 9 0 1 2 3 4 5 6 7 8 9 0 1 2 3 4 5 6 7 8 9 0 1
      +-+-+-+-+-+-+-+-+-+-+-+-+-+-+-+-+-+-+-+-+-+-+-+-+-+-+-+-+-+-+-+-+
Share |         Type = Share          |          Length = 4           |
group +-+-+-+-+-+-+-+-+-+-+-+-+-+-+-+-+-+-+-+-+-+-+-+-+-+-+-+-+-+-+-+-+
type  |          Share Flag           |         Share Number          |
      +-+-+-+-+-+-+-+-+-+-+-+-+-+-+-+-+-+-+-+-+-+-+-+-+-+-+-+-+-+-+-+-+
      |                        Share Service ID                       |
```

TABLE 2

| Field Name | Description | Value |
| --- | --- | --- |
| Type | A TLV type, a newly added hop sharing type | A 16-bit value |
| Length | A TLV length, in bytes | A 16-bit value |
| Share Flag | Whether the hop resource is shared | A 16-bit value |
| Share Number | Sharing degree of the hop resource | A 16-bit value |
| Share Service ID | A shared service group ID | A 32-bit value |

Manner 2: The Network Device is the Head Node on the First Working Path

When the network device is the head node on the first working path, the head node (the first head node) of the first working path can learn of the routing information and the share group information of the first protection path. Different from the foregoing manner 1, in manner 2, the network device does not need to send the first configuration message to the first head node, that is, S621 does not need to be performed.

Manner 3: The Network Device is the Head Node on the Second Working Path

When the network device is the head node on the second working path, the head node (the second head node) of the second working path can learn of the routing information and the share group information of the second protection path. Different from the foregoing manner 1, in manner 2, the network device does not need to send the first configuration message to the second head node, that is, S622 does not need to be performed.

Manner 4: The Network Device is the Head Node of the Protection Path Segment

When the network device is the head node of the protection path segment, the head node on the protection path segment can learn of routing information of the protection path segment. Different from the foregoing manner 1, in manner 4, the network device does not need to send a configuration message to the head node of the protection path segment, that is, the network device does not need to send a third configuration message and a fourth configuration message to the head node of the protection path segment.

A signaling interaction process between other nodes (the first head node, the second head node, and the last node) and the network device is the same as that in manner 1, and details are not described herein again.

S630: A service head node establishes a service protection group based on a configuration message.

This step is described in detail through the foregoing manner 1 as an example.

This step further includes: S631: The first head node establishes a service protection group of the first protection path based on the received first configuration message. S632: The second head node establishes a service protection group of the second protection path based on the received second configuration message. Specifically, the first configuration message includes the routing information of the first protection path, and the first head node establishes the service protection group based on the routing information of the first protection path, to switch the first service to the first protection path for transmission when a fault occurs on the first working path for transmitting the first service. Similarly, the second head node establishes a second protection group on the local node based on the second configuration message, to switch the second service to the second protection path for transmission when a fault occurs on the second working path for transmitting the second service.

S640: The service head node sends a configuration message to another downstream node.

This step further includes the following steps.

S641: The first head node sends a third configuration message to a third node.

S642: The second head node sends a fourth configuration message to the third node.

S643: The third node sends a fifth configuration message to a fourth node.

S644: The third node sends a sixth configuration message to a fifth node. The third node is a head node of the protection path segment, the fourth node is a last node of the first working path, and the fifth node is a last node on the second working path.

The third configuration message includes the routing information of the first protection path, whether the protection path segment is shared, a sharing degree, and a service group ID. The fourth configuration message includes the routing information of the second protection path, whether the protection path segment is shared, a sharing degree, and a service group ID. The fifth configuration message includes the routing information of the first protection path. The sixth configuration message includes the routing information of the second protection path.

In a possible manner, the network device may deliver the first configuration message, the second configuration message, the third configuration message, the fourth configuration message, the fifth configuration message, and the sixth configuration message to the corresponding nodes respectively. It should be understood that the nodes in this embodiment are merely used as examples, and do not constitute a limitation on the technical solutions. In practice, many nodes may pass through a working path and a protection path of a service, and this embodiment is only a simplest node architecture.

After receiving the corresponding configuration message, another downstream node establishes a virtual connection of the protection path locally. Specifically, the third node establishes a virtual connection of the first protection path based on the third configuration message, and at the same time, the third node establishes a virtual connection of the second protection path based on the fourth configuration message. The fourth node establishes a virtual connection of the first protection path based on the fifth configuration message, and the fifth node establishes a virtual connection of the second protection path based on the sixth configuration message. The virtual connection means that the first protection path occupies only a small bandwidth resource (for example, 2 M) of each node, and is used to establish a cross-connection of the first protection path corresponding to the first service, without transmitting the first service on the protection path. To distinguish a target bandwidth of a service, in this embodiment of this application, a bandwidth occupied for establishing a protection path is referred to as a protection bandwidth.

By establishing the virtual connection of the protection path, not only fast switching can be performed when a fault occurs on the working path of the service, to improve the switching speed, but also the protection path does not need to occupy double bandwidth resources, thereby reducing costs.

It should be noted that, because the fourth node is the last node on the first working path, and is different from the intermediate node, a third protection group needs to be established locally, to switch the first service to the first protection path for transmission when a fault occurs on the first working path for transmitting the first service. Similarly, because the fifth node is the last node on the second working path, a fourth protection group needs to be established locally, to switch the second service to the second protection path for transmission when a fault occurs on the second working path for transmitting the second service.

For example, the cross-connection of the virtual connection in this embodiment may include an ingress port, a channel, a bandwidth, and an egress port of the first service on the current node, and an ingress port, a channel, a bandwidth, and an egress port of the second service on the current node. For example, the first service passes through ingress port 1-channel 1-egress port 1 on the current node, and occupies a bandwidth of 2 M. For another example, the second service passes through ingress port 2-channel 2-egress port 2 on the current node, and occupies a bandwidth of 2 M.

For example, in this embodiment, the configuration message sent by the service head node to another downstream node may be an RSVP-TE signaling message, or the con-figuration message may be a protocol message that has a same function as the RSVP-TE. For example, the third configuration message may be implemented through a new field (for example, an extended RSVP field) in original signaling between the first head node and the third node.

A packet format of the configuration message in this application may be shown as follows:

```
RSVP<Path Message>::=
    <Common Header>
    <MESSAGE-ID>
    <SESSION> object
    <HOP> Object
        <Third node HOP> object
        Newly added<share group information>TLV
    <TIME VALUES> object
    <LABEL REQUEST> object
    <EXPLICIT_ROUTE> object
```

Table 3 shows the TLV field in the RSVP message, which indicates that the specific Hop type is the protection virtual connection. Table 4 shows the meaning of the TLV field.

TABLE 3

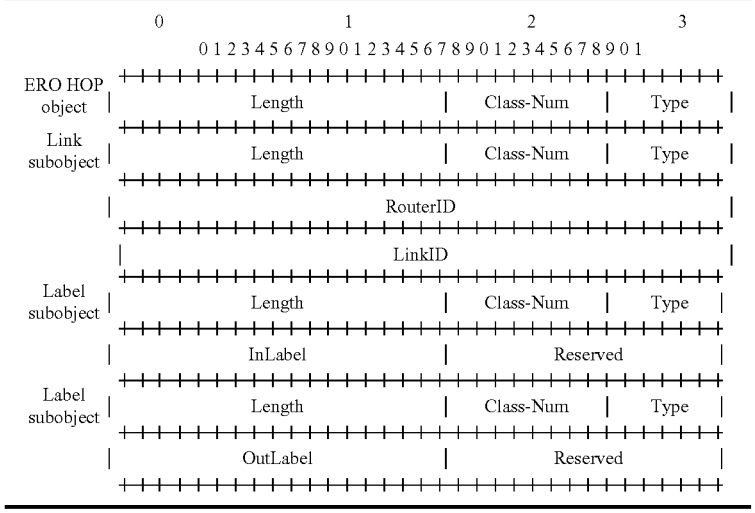

TABLE 4

| Field Name | Description | Value |
|---|---|---|
| Length | A total object length, in bytes | A 16-bit value |
| Class-Num | An identifier object class: each object class has a name | An 8-bit value |
| Type | An object type, unique in Class-Num, where this field indicates the Hop type of the protection virtual connection | An 8-bit value |
| RouterID | A node ID address | A 32-bit value |
| LinkID | An egress link ID | A 32-bit value |
| InLabel | An incoming label, indicating a channel/wavelength | A 16-bit value |
| Reserved | A reserved byte | A 16-bit value |
| OutLabel | An outgoing label, indicating a channel/wavelength | A 16-bit value |
| Reserved | A reserved byte | A 16-bit value |

It should be noted that, after other downstream nodes establish protection path virtual connections based on the configuration message, this step further includes: Each downstream node sends a response message to the head node, indicating that the local node has established the protection path virtual connection of the service. For example, the third node sends a first response message to the first head node, indicating that the third node has established the protection path virtual connection of the first service; and at the same time, the third node sends a second response message to the second head node, indicating that the third node has established the protection path virtual connection of the second service. The fourth node sends a third response message to the first head node, indicating that the fourth node has established the protection path virtual connection of the first service. The fifth node sends a fourth response message to the second head node, indicating that the fifth node has established the protection path virtual connection of the second service.

For example, after receiving the response message sent by each node on the first protection path, the first head node reports a message indicating that the virtual connection of the first protection path is successfully established to the NCE, and the NCE delivers the first service to the first head node. For example, after receiving the response message sent by each node on the second protection path, the second head node reports a message indicating that the virtual connection of the second protection path is successfully established to the NCE, and the NCE delivers the second service to the second head node.

S650: The first head node receives a path fault message of the fourth node.

In this embodiment, when a fault (for example, a fiber cut) occurs on the working path between the first head node and the fourth node, the fourth node sends a path fault message to the first head node, where the path fault message indicates that a fault occurs on the working path between the first head node and the fourth node. The path fault message is carried in an overhead of a data frame.

For example, the path fault message includes an ID of an affected service, and further includes an automatic protection switching (APS) message, and the APS message is further used to indicate the first head node to switch the first service to the first protection path.

It should be noted that, in this embodiment, that the first head node receives the path fault information of the fourth node is merely an example, and actually does not constitute a limitation on the technical solutions. For example, when another node exists on the first working path between the first head node and the fourth node, the another node may also receive the path fault information from the fourth node. The node may be specifically a head node of a protection path segment. Alternatively, the first head node may perceive that a fault occurs on the working path, without the need to receive the path fault information sent by the fourth node.

S660: The first head node sends a bandwidth activation message to the third node.

The first head node inserts the bandwidth activation message into a first data frame, where the bandwidth activation message indicates the downstream node to activate and configure the target bandwidth of the first service. Specifically, the bandwidth activation message includes at least the target bandwidth of the first service, and the target bandwidth is further used to indicate the downstream node to adjust the bandwidth of the first service from the protection bandwidth to the target bandwidth. The protection bandwidth is a bandwidth occupied by the virtual connection of the first protection path established for the first service.

For example, in addition to the bandwidth activation message, the first data frame further includes an APS message, where the APS message indicates the fourth node to switch the first service to the first protection path.

For example, the first data frame includes a payload area, and the bandwidth activation message and the APS message are carried in the payload area.

For example, the payload area further includes at least one of the following information: a protocol packet length, a message type, a version number, and a service ID of the first protection path, where the message type indicates that the first data frame carries the bandwidth activation message and the APS message.

For example, after sending the bandwidth activation message to the downstream node on the first protection path, the first head node switches the first service to the first protection path. In this way, the bandwidth activation message is first sent and then the local protection group is switched. In one aspect, it can be ensured that the bandwidth activation signaling can be successfully sent. If the protection group is switched first, because the downstream node has not completed bandwidth adjustment, a bandwidth of a service data flow is generally far greater than the protection bandwidth. As a result, it is difficult to send the bandwidth activation signaling. In another aspect, it can be ensured that the bandwidth activation signaling is quickly transmitted to the peer node for protection switching, implementing fast service recovery.

Before performing this step, the first head node further needs to obtain an affected service ID in the path fault message, that is, a first service ID, to find, based on the first service ID, a virtual connection service ID corresponding to shared protection. The virtual connection service ID may be used by the downstream node to determine whether there is another service that shares a bandwidth resource with the first service in the protection path segment.

The downstream node then completes target bandwidth configuration and path switching of the first service based on the bandwidth activation message and the APS message. The first service is switched from the first working path to the first protection path. The detailed configuration, that is, the switching process, is not described herein.

S670: The third node forwards the bandwidth activation message to the fourth node.

For example, the third node forwards the APS message to the fourth node simultaneously, where the APS message indicates the fourth node to switch the service to the first protection path.

S671: The fourth node switches the first service to the first protection path.

For example, the fourth node switches the service to the first protection path based on the APS message.

S680: The first head node sends service path switching success information to the network device.

When detecting that no alarm is generated in an end-to-end service state, the first head node notifies the network device that the first service has been successfully switched from the first working path to the first protection path.

Figure 7:
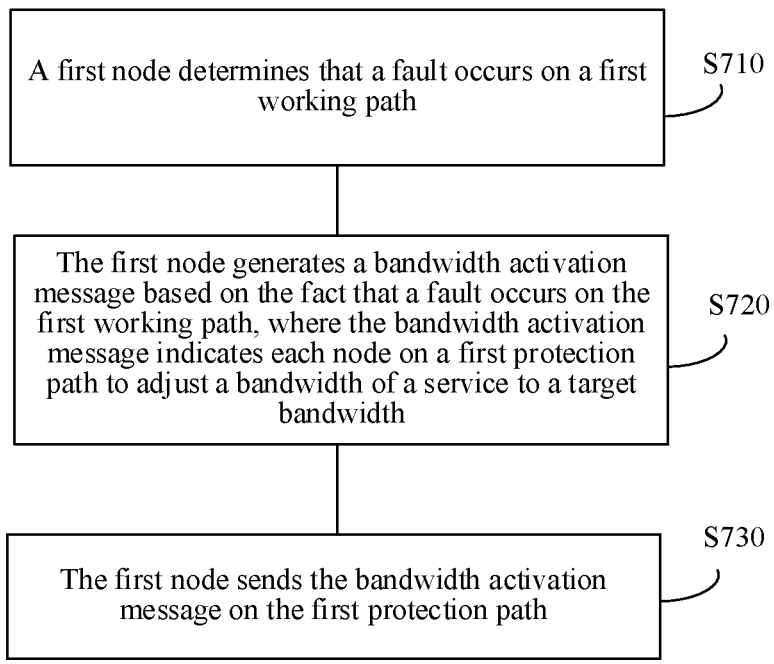
FIG. 7 is a flowchart of a service protection method according to an embodiment of this application.

FIG. 7 is a flowchart of a service protection method according to an embodiment of this application. An execution body of the method may be the first head node in FIG. 6, that is, a service head node, or may be a shared protection segment head node.

S710: A first node determines that a fault occurs on a first working path.

This embodiment is described by using an example in which an execution body is the first head node in FIG. 6.

For example, the first head node receives a path fault message from a fourth node, where the path fault message indicates that a fault occurs on the first working path between the first head node and the fourth node, so that the first head node determines that a fault occurs on the first working path. Specifically, that a fault occurs on the first working path may include: a fault occurs on a node on the first working path, or a fault occurs on a link between adjacent nodes on the first working path, for example, a fiber cut. This is not limited in this embodiment. The first head node determines, based on the path fault message, that a fault occurs on the first working path. For example, the path fault message may be an RSVP Notify message, where the RSVP Notify message is a path event notification message. For a format of the RSVP Notify message, refer to an existing Notify message. The RSVP Notify message carries an affected service ID and fault source information. The fault source information may include a fault of a link between a node and an adjacent node, or a fault of a node port, or a fault of another type. This is not limited in this embodiment. For example, the path fault message carries an ID of a first service and the fault source information of the fault in the link between the first head node and the fourth node.

For example, the path fault message is inserted into a first OSU frame by the fourth node and transmitted to the first head node. For example, the path fault information is inserted into an operation, administration and maintenance (OAM) overhead of the OSU frame.

Optionally, that the first head node receives the path fault message includes: The first head node receives a data frame from the fourth node, demaps the data frame to obtain the OSU frame, and then obtains the path fault message from the overhead of the OSU frame.

S720: The first node generates a bandwidth activation message based on the fact that a fault occurs on the first working path.

In this embodiment, the bandwidth activation message indicates each node on the first protection path to adjust a bandwidth of a service from a protection bandwidth to a target bandwidth.

For example, the first node generates an APS message based on the fact that a fault occurs on the first working path, where the APS message indicates a second node to switch the service to the first protection path.

Because the first protection path is a virtual connection, before service switching is performed, the first protection path occupies only a small bandwidth resource, for example, 2 M, which is referred to as a protection bandwidth in this application and represents a pre-occupied bandwidth of the first protection path before transmission of the service. The bandwidth activation message is further used to indicate each node on the first protection path to adjust the first service from the protection bandwidth to the target bandwidth, for example, 100 M, to transmit the service normally.

The first head node shown in FIG. 6 is used as an execution body. For example, the first head node first determines the target bandwidth of the service based on the affected service ID carried in the path fault message, and then converts the target bandwidth into a bandwidth activation message field.

For example, the first head node may further determine, based on the affected service ID carried in the path fault message, a virtual connection service ID of the service as a sending option. The first head node pre-stores a correspondence between the affected service ID and the virtual connection service ID in the node, and obtains the correspondence when receiving a path fault message sent by another node.

For example, the first node inserts the bandwidth activation message and the APS message into the first data frame. The first data frame may be a flexible optical service unit OSU frame.

In this embodiment, as a flexible encapsulation format in the OTN, a length of the OSU frame may be 192 bytes, or one of 240 bytes, 128 bytes, and 64 bytes. With development of technologies, the length may also be another byte quantity. This is not limited in this application. Only an example in which the length of the OSU frame is 192 bytes is used for description. The OSU frame includes an overhead area (overhead) and a payload area (payload), and a payload area field may be self-defined.

For example, the bandwidth activation message is inserted into the payload area, and occupies four bytes, with 32 bits in total.

For example, a second OSU frame further carries an automatic protection switching APS message, and the APS message is inserted into the payload area, and occupies two bytes, with 16 bits in total. The APS message indicates a last node on the first protection path to switch the service to the first protection path. It should be noted that, the protection switching information is transparently transmitted at an intermediate node (for example, a third node) of the first protection path, and is acquired only at the last node. The intermediate node only needs to obtain the bandwidth activation information.

Optionally, the second OSU frame further carries a protocol packet length, and the protocol packet length is inserted into the payload area, and occupies one byte, with eight bits in total.

Optionally, the second OSU frame further carries a message type, indicating that the OSU frame carries the bandwidth activation message and/or the APS message. The message type is inserted into the payload area, and occupies one byte, with eight bits in total.

Optionally, the second OSU frame further carries a service ID, which is a virtual connection service ID in this embodiment. As a unique identifier of an end-to-end path, the virtual connection service ID is used by a downstream node to determine whether there is another service that shares a bandwidth with the first service. The virtual connection service ID is inserted into the payload area, and occupies four bytes, with 32 bits in total.

Table 5 shows a payload area message format provided in this embodiment. Descriptions of fields in the message format are shown in Table 6. Table 7 shows a frame format of an OSU frame.

TABLE 5

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Length     |  Message_Type |      Ver      |      Resv     |
+-+-+-+-+-+-+-+-+-+-+-+-+-+-+-+-+-+-+-+-+-+-+-+-+-+-+-+-+-+-+-+-+
|                           Service_ID                          |
+-+-+-+-+-+-+-+-+-+-+-+-+-+-+-+-+-+-+-+-+-+-+-+-+-+-+-+-+-+-+-+-+
|                           Bandwidth                           |
+-+-+-+-+-+-+-+-+-+-+-+-+-+-+-+-+-+-+-+-+-+-+-+-+-+-+-+-+-+-+-+-+
|             APS               |             Resv              |
+-+-+-+-+-+-+-+-+-+-+-+-+-+-+-+-+-+-+-+-+-+-+-+-+-+-+-+-+-+-+-+-+
```

TABLE 6

| Field Name | Description | Value |
| --- | --- | --- |
| Len | A protocol packet length | An 8-bit value |
| Message_type | A specific message type: identify bandwidth activation + APS dual-ended switching | An 8-bit value |
| Ver | A version number | An 8-bit value |
| Service ID | A virtual connection service ID, a unique ID of an end-to-end path | A 32-bit value |
| Bandwidth | A service bandwidth attribute | A 32-bit value |
| APS | A protocol dual-ended switching byte, consistent with the standard definition | A 16-bit value |
| Reserved | A reserved byte, used to extend a service attribute subsequently | |

TABLE 7

| | ◄──────────────── 192 bytes ────────────────► | | | | | | | |
| --- | --- | --- | --- | --- | --- | --- | --- | --- |
| 12 bits ◄──► | | | | | | | | |
| Type | Len | Message_type | Ver | Service ID | Bandwidth | Bandwidth | APS | Reserved |
| Overhead area ◄──► (7 bytes) | ◄──────── Payload area (185 bytes) ────────► | | | | | | | | aspect, it can be ensured that the bandwidth activation signaling can be successfully sent. If the protection group is switched first, because the downstream node has not completed bandwidth adjustment, a bandwidth of a service data flow is generally far greater than the protection bandwidth. As a result, it is difficult to send the bandwidth activation signaling. In another aspect, it can be ensured that the bandwidth activation signaling is quickly transmitted to the peer node for protection switching, implementing fast service recovery.

In the service protection method provided in the foregoing embodiment, an end-to-end virtual connection of a shared protection path is pre-established before a fault occurs in a service. When a fault occurs on a working path of the service, a service head node implements end-to-end forwarding of the protection path by carrying control signaling in an OSU frame, and implements quick validation of the protection path of the service through a head and last node protection switching mechanism and bandwidth activation signaling, so that service performance can be quickly recovered. According to the foregoing method, a protection path virtual connection is pre-established for a plurality of services, and the protection path virtual connection shares the bandwidth of the protection path segment. In one aspect, bandwidth resources can be saved, and in another aspect, a switching speed can be increased, so that service performance can be quickly recovered.

Figure 8:
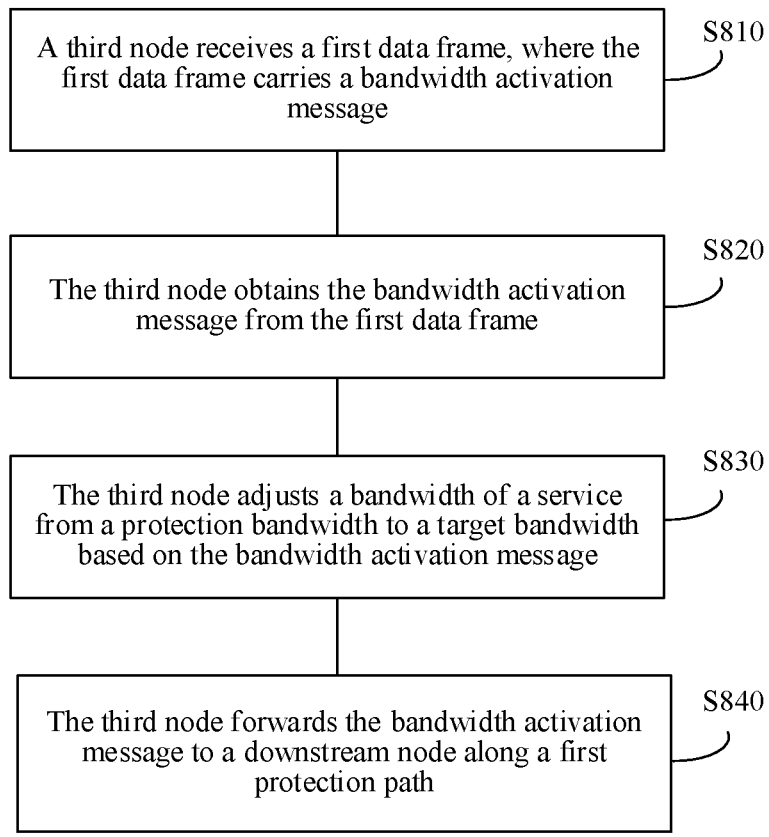
FIG. 8 is a flowchart of another service protection method according to an embodiment of this application.

FIG. 8 is a flowchart of another service protection method according to an embodiment of this application. The method is applicable to the third node in FIG. 6. An example in which an execution body is the third node in FIG. 6 is used for description.

S810: The third node receives a first data frame, where the first data frame carries a bandwidth activation message.

The following uses an example in which the first data frame is an OSU frame for description.

The third node receives an OSU frame from a first node, where the OSU frame carries a bandwidth activation message, and the bandwidth activation message indicates the S730: The first node sends the bandwidth activation message on the first protection path.

For example, the first node sends, on the first protection path, the first data frame that carries the bandwidth activation message.

For example, the first data frame further carries the APS message. The following uses an example in which the first data frame is an OSU frame for description.

In this embodiment, because a cross-connection of the first protection path is established, the first node may directly send the OSU frame on the first protection path. In addition, the first protection path is a standby path corresponding to the first service. Therefore, a node on the first protection path can automatically identify the target bandwidth in the OSU frame for bandwidth activation for the first service.

This step further includes: The first node maps the OSU frame to a higher order OTN frame, for example, an ODUk frame, and then sends the OTN frame on the first protection path.

For example, after sending the bandwidth activation message to the downstream node on the first protection path, the first node switches the first service to the first protection path. In this way, the bandwidth activation message is first sent and then the local protection group is switched. In one third node to activate and configure a target bandwidth of a service. For example, the bandwidth activation message may be the target bandwidth of the service.

For example, the OSU frame further carries an APS message, where the APS message indicates a last node (for example, the second node in FIG. 6) of a protection path segment to switch the service to a protection path.

Specifically, the third node shown in FIG. 6 is used as an execution body. The third node receives an OTN frame (for example, an ODUk frame) from a first head node, and demaps the OTN frame to obtain the OSU frame.

S820: The third node obtains the bandwidth activation message from the first data frame.

For example, the OSU frame includes an overhead area and a payload area, and the bandwidth activation message is located in the payload area, and occupies four bytes, with 32 bits in total. The OSU frame may further carry an APS message, where the APS message indicates a last node on a working path to switch the service to the protection path. The APS message is also located in the payload area, and occupies two bytes, with 16 bits in total.

For example, the OSU frame further includes at least one of the following information: a protocol packet length, a message type, a version number, and a service ID of the protection path, where the message type indicates a message carried in the OSU frame. The service ID of the protection path is used by the third node to determine whether there is another service that shares a resource with a first service.

S830: The third node adjusts the service from a protection bandwidth to a target bandwidth based on the bandwidth activation message.

For example, the bandwidth activation message includes a target bandwidth of the first service, and the third node adjusts a bandwidth of the first service from the protection bandwidth to the target bandwidth based on the bandwidth activation message, where the protection bandwidth represents a bandwidth occupied by a virtual connection of the first protection path established for the first service.

When determining that a current remaining bandwidth is greater than the target bandwidth of the first service, the third node directly activates the protection bandwidth of an ingress/egress channel corresponding to the first service of the local node to the target bandwidth.

When determining that the current remaining bandwidth is less than the target bandwidth of the first service, the third node obtains, based on a virtual connection service ID of the first service, an ID of a service group that shares the bandwidth of the protection path segment, and further obtains IDs of N associated services that share the bandwidth with the first service. In this case, if a sum of the remaining bandwidth and protection bandwidths of N+1 services is greater than the target bandwidth of the first service, the third node adjusts the protection bandwidth of the associated services to zero, and then adjusts the bandwidth of the first service from the protection bandwidth to the target bandwidth. For example, protection bandwidths of the first service and three other associated services (N=3) in the protection path segment are all 2 M, the target bandwidth of the first service is 100 M, and the remaining bandwidth of the third node is 92 M. The third node learns, through calculation, that the sum of the remaining bandwidth and the protection bandwidths of the N+1 services is 92 M+2 M*(3+1), which is equal to the target bandwidth of the first service, and then adjusts the protection bandwidths of the associated services to 0 and adjusts the bandwidth of the first service to the target bandwidth.

It should be noted that, when the sum of the remaining bandwidth and the protection bandwidths of the N+1 services is greater than the target bandwidth of the first service, the third node may select a part of the associated services, and adjust the protection bandwidths of the part of the associated services to 0, or may adjust the bandwidths of all the associated services to 0, and then adjust the bandwidth of the first service to the target bandwidth. A specific processing manner is not limited in this embodiment of this application.

It should be further noted that, when the sum of the remaining bandwidth and the protection bandwidths of the N+1 services is less than the target bandwidth of the first service, the third node does not perform processing. Alternatively, the third node sends activation failure information to the first head node.

S840: The third node forwards the bandwidth activation message to a downstream node along the first protection path.

For example, the third node forwards the OSU frame carrying the bandwidth activation message to the downstream node along the first protection path. For example, the OSU frame further includes an APS message.

Figure 9:
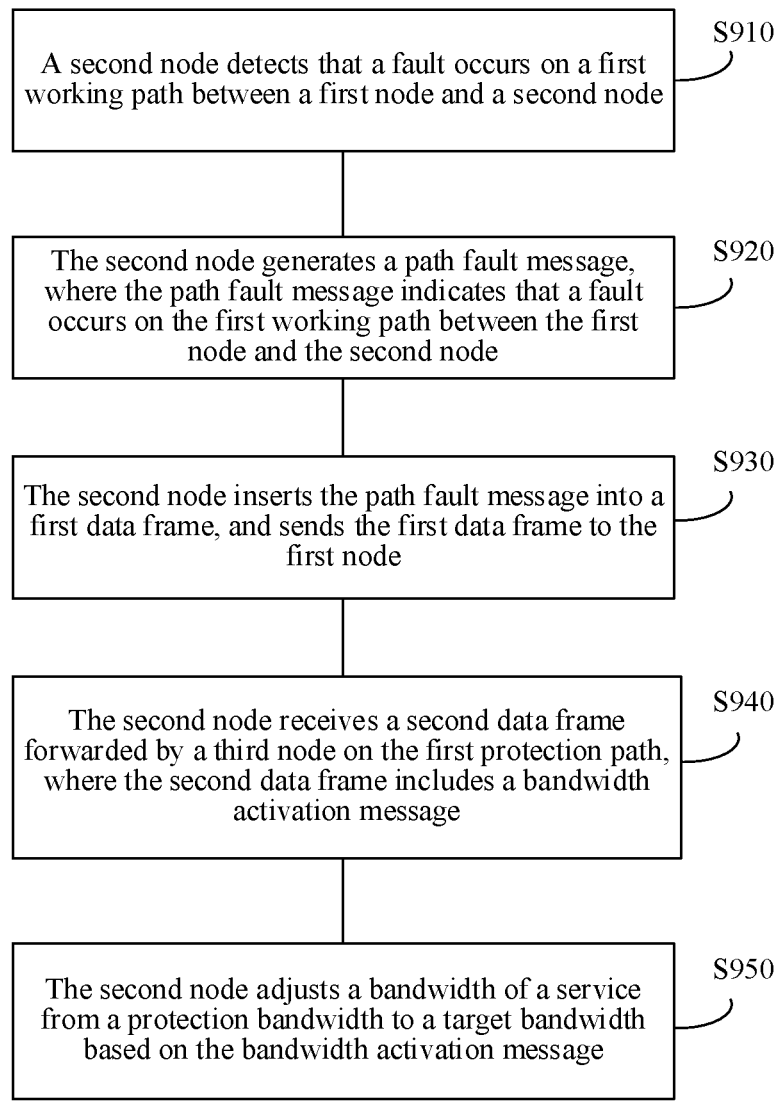
FIG. 9 is a flowchart of still another service protection method according to an embodiment of this application.

FIG. 9 is a flowchart of still another service protection method according to an embodiment of this application. The method may be applied to the fourth node shown in FIG. 5. The following uses an example in which an execution body is the fourth node for description.

S910: A second node detects that a fault occurs on a first working path between a first node and the second node.

In a normal state, the second node may receive service data from the first node. When a fault occurs on the working path between the first node and the second node, the second node cannot receive the service data from the first node within a specific period of time, or receives damaged data (for example, a packet loss or a bit error) from the first node. In this case, it is determined that a fault occurs on the first working path. The fault further includes a fault in a link between the first node and the second node, for example, a fiber cut, and may further include a fault in a sending port of the first node, or a fault in a receiving port of the second node, and may further include a fault of another type.

S920: The second node generates a path fault message.

The path fault message indicates that a fault occurs on the first working path between the first node and the second node.

The path fault message in this embodiment may be an RSVP Notify message, where the RSVP Notify message is a path event notification message. For a specific format of the RSVP Notify message, refer to an existing Notify message. The path fault message may carry an affected service ID, fault source information, and the like.

S930: The second node inserts the path fault message into a first data frame, and sends the first data frame to the first node.

For example, the second node inserts the path fault message into an overhead of a first OSU frame, and sends the overhead to the first node.

It should be noted that, the foregoing step is an optional step. In practice, the first node may also perceive that a fault occurs on the working path of the service.

S940: The second node receives a second data frame forwarded by the third node on the first protection path.

For example, the second OSU frame includes a bandwidth activation message and an APS message, where the bandwidth activation message indicates the second node to adjust the bandwidth of the first service from the protection bandwidth to the target bandwidth, and the APS message indicates the second node to switch the service to the first protection path. For example, the second data frame may alternatively carry only the bandwidth activation message, and the second node switches the service to the first protection path based on the bandwidth activation message.

For example, the second data frame is a second OSU frame, and the bandwidth activation message and the APS message are carried in a payload area of the second OSU frame.

S950: The second node adjusts the bandwidth of the first service from the protection bandwidth to the target bandwidth based on the bandwidth activation message, and switches the first service to the first protection path based on the APS message.

For example, the second node obtains the bandwidth activation message and the APS message from the payload area of the second OSU frame. The second node then adjusts the bandwidth of the first service from the protection bandwidth to the target bandwidth based on the bandwidth activation message, and switches the first service to the first protection path based on the APS message.

Figure 10:
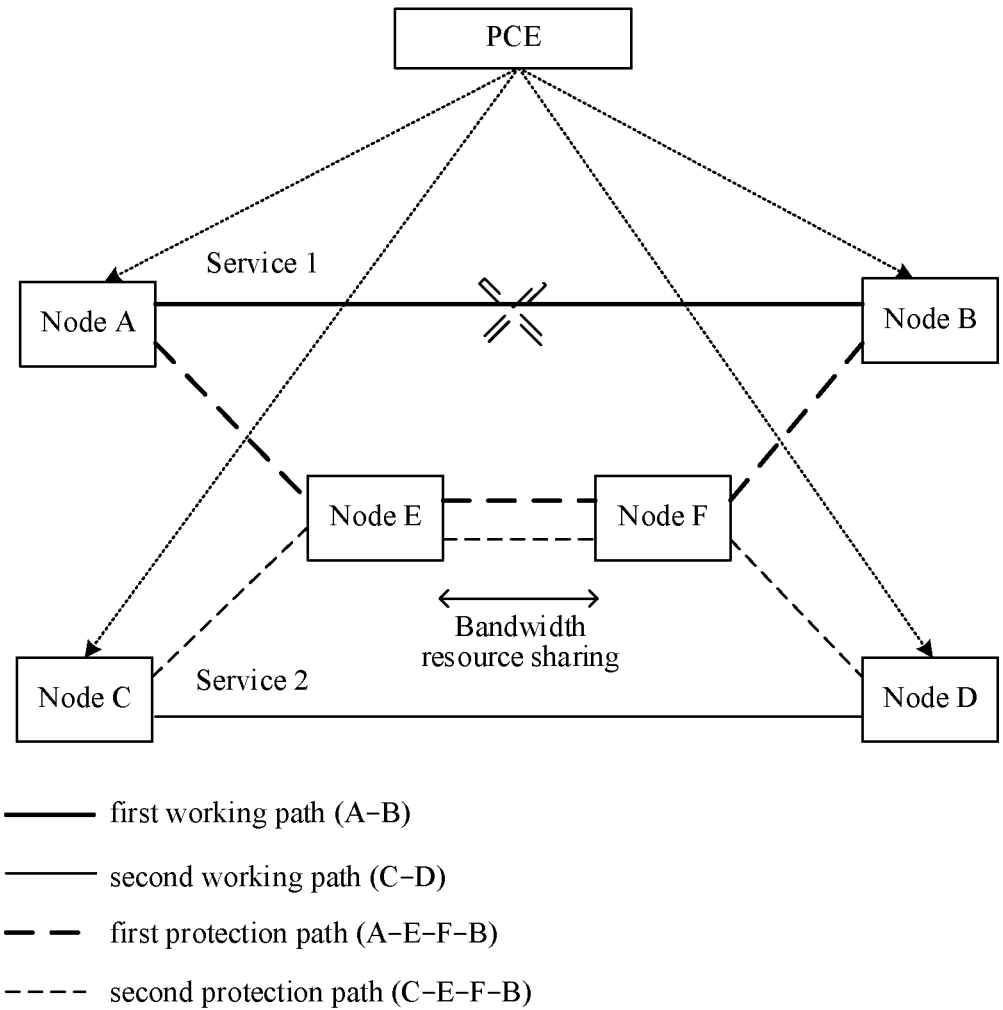
FIG. 10 is a diagram of a scenario to which a service protection method can be applied according to an embodiment of this application.

FIG. 10 is a diagram of a scenario to which a service protection method can be applied according to an embodiment of this application.

As shown in FIG. 10, an application network of this scenario is a GMPLS/ASON, which has an ASON automation function. The ASON shown in FIG. 10 has six nodes: A, B, C, D, E and F. In this embodiment, the ASON function is enabled on the nodes A, B, C, D, E and F, the RSVP and a bandwidth activation apparatus are deployed on each node, and a protection group switching apparatus is further configured on head and last nodes of a service. Network information such as network-wide nodes and links is automatically obtained through the OSPF of the ASON protocol or an open shortest path first-traffic engineering (OSPF-TE). End-to-end service path provisioning and recovery are automatically established through the RSVP-TE of the ASON protocol. A PCE automatically obtains network-wide nodes, links, and service information based on the OSPF or a path computation element communication protocol (PCEP). The PCE mainly handles end-to-end path computation of network services, and can be deployed on a server network management system or similar devices. If no PCE is deployed in the network, an end-to-end path of a network service may be computed by each node in a distributed manner.

In this embodiment, shared protection for two services is taken as an example to describe FIG. 1.

In the scenario shown in FIG. 10, the service protection method provided in this embodiment of this application includes the following steps.

Step 1:

A service 1 has a first working path A-B, and a service 2 has a second working path C-D. After NCE provisions the service 1 and the service 2 of the shared protection type, the PCE obtains network-wide services and network topology, and computes protection paths for the service 1 and the service 2 based on different separation paths and shareable resource policies. The PCE determines a first protection path A-E-F-B of the service 1 and a second protection path C-E-F-D of the service 2, where E-F is a shared protection path segment, and the two services share a bandwidth of the protection path segment.

It should be noted that, the sharing described in this embodiment may include the following cases: (1) 1:N sharing of services at a same rate, that is, one bandwidth resource is shared by N services at a same rate. For example, N services at a rate of 100 M share 100 M bandwidth. (2) 1:N sharing of services at different rates, that is, one bandwidth resource is shared by N services at different rates. For example, three services at rates of 50 M, 70 M, and 100 M respectively share 100 M bandwidth. (3) M:N sharing of services at a same rate, M<N, that is, M bandwidth resources are shared by N services at the same rate. For example, ten 100 M services share seven 100 M bandwidth resources. (4) M:N sharing of services at different rates, M<N, that is, M bandwidth resources are shared by N services at different rates. For example, three services at rates of 50 M, 70 M, and 100 M respectively share 100*2=200 M broadband resources.

Step 2:

The PCE delivers a protection path of each service to a head node of the service. As shown in FIG. 10, the PCE delivers the first protection path A-E-F-B to the node A, and delivers the second protection path C-E-F-D to the node C. In addition, delivered content may further include whether the first protection path and the second protection path share resources, a sharing degree, and a shared service group ID. The sharing degree indicates a quantity of services in the shared protection path segment. For example, in this embodiment, the service 1 (the protection path A-E-F-B) and the service 2 (the protection path C-E-F-D) share resources in the E-F segment, and the sharing degree is 2.

The PCE may deliver the protection path of the service to the service head nodes A and C through a PCEP protocol signaling message, or through a protocol message that has a same function as the PCEP, for example, through a newly added field (for example, extended TLV information) in original signaling between the PCE and the node A. The TLV is a variable format, which means: type, length, and value, where the type field is information about a label and an encoding format, the length field is a length of a defined value, and the value field indicates an actual value. Lengths of the type field and the length field are generally fixed, for example, two or four bytes. For a specific format of the signaling field, refer to the foregoing embodiment, and details are not described herein again.

Step 3:

After receiving the service protection path, the head node initiates establishment of a protection path virtual connection with bandwidth sharing. As shown in FIG. 10, the node A initiates signaling to establish a virtual connection of the protection path A-E-F-B, and the node C initiates signaling to establish a virtual connection of the protection path C-E-F-D. Specifically, the virtual connection establishment signaling sent by the node A and the node C may include the segment E-F being a virtual connection, whether to share, a sharing degree, and a shared service group ID.

The virtual connection establishment signaling sent by the head node to the downstream may be an RSVP-TE signaling message, or may be a protocol message that has the same function as the RSVP-TE. For example, the signaling message may be implemented through a new field (for example, an extended RSVP field) in original signaling between the first head node and the third node. For a format of the extended RSVP field, refer to the foregoing embodiment, and details are not described herein again.

Specifically, the head nodes A and C directly establish a protection group locally, to switch the service to the protection path through the protection group when a fault occurs on the working path. Service data is single output and single input. Because the protection path is a virtual connection, the protection path is not used to transmit the service data.

After receiving the virtual connection establishment signaling, the intermediate nodes E and F learn that the signaling is establishment of a shared protection virtual connection, and the segment E-F is shared, and then locally establish a virtual cross-connection whose bandwidth is a protection bandwidth (for example, 2 M). A cross-connection of the service 1 is ingress port 1-channel 1-bandwidth 2 M, and egress port 1-channel 1-bandwidth 2 M; and a cross-connection of the service 2 is ingress port 2-channel 2-bandwidth 2 M, and egress port 2-channel 2-bandwidth 2 M. In addition, according to a resource sharing relationship (the sharing degree and the shared service group ID), a protection channel resource sharing relationship of the service 1 and the service 2 is stored in a local bandwidth activation unit. Target bandwidths of the service 1 and the service 2 are both 100 M.

For the last nodes B and D of the service, the processing is the same as that of the head nodes A and C. A protection group is established locally, to switch the service to the protection path through the protection group when a fault occurs on the working path. Service data is single output and single input. Because the protection path is a virtual connection, the protection path is not used to transmit the service data.

Step 4:

When a fault occurs between the nodes A and B, the head node A detects the fault on the working path of the service through the OAM overhead of the OSU frame. For an A-B unidirectional fault, the bandwidth activation information may be carried in the OSU frame and a double-ended switching byte of the APS protocol may be added. Compared with the single APS overhead reverse insertion alarm to the peer node, the dual-ended switching is more efficient.

Step 5:

The head node finds an affected service ID based on the alarm, finds a corresponding recovered shared protection virtual connection service ID, and performs end-to-end bandwidth activation through channel associated signaling carried in the OSU frame. Channel associated bandwidth activation signaling with a head node being A, a last node being B, and a service path being A-E-F-B needs to carry only a target bandwidth and dual-ended switching information of the APS protocol, and selectively carries the virtual connection service ID.

For the head node A, a channel associated data plane cell of the OSU frame needs to be extended. Currently, there are two manners. In manner 1, a new PT number is extended and reserved for channel associated bandwidth activation control signaling. In manner 2, a channel associated overhead message sub-Type type is extended on an existing OAM data plane (PT: 111) (the most significant 4 bits 1000 indicate that the OAM is a control signaling type, and the least significant 8 bits 00000001 indicate a specific control type of bandwidth configuration activation). Alternatively, an extension field in the payload area carries a specific control type, further needs to carry a bandwidth activation message and an APS message, and may selectively carry information such as a protocol packet length, a version number, and a service virtual connection ID.

For the intermediate nodes E and F, and the last node B, after a message type of the OSU frame is extracted, the message type is fixedly sent to the bandwidth activation unit for processing. When determining that a current remaining bandwidth is greater than the target bandwidth of the first service, the node directly activates the protection bandwidth 2 M of an ingress/egress channel corresponding to the service 1 of the local node to the target bandwidth 100 M.

Using the intermediate node E as an example, when determining that the current remaining bandwidth is less than the target bandwidth of the service 1, the node E obtains, based on a virtual connection service ID of the service 1, an ID of a service group that shares the bandwidth of the protection path segment, and further obtains IDs of N associated services that share the bandwidth with the service 1. In this case, if a sum of the remaining bandwidth and protection bandwidths of N+1 services is greater than the target bandwidth of the service 1, the intermediate node E adjusts the protection bandwidth of the associated services to zero, and then adjusts the bandwidth of the service 1 from the protection bandwidth to the target bandwidth. For example, protection bandwidths of the service 1 and three other associated services (N=3) in the protection path segment are all 2 M, the target bandwidth of the service 1 is 100 M, and the remaining bandwidth of the node E is 92 M. The node E learns, through calculation, that the sum of the remaining bandwidth and the protection bandwidths of the N+1 services is 92 M+2 M*(3+1), which is equal to the target bandwidth of the service 1, and then adjusts the protection bandwidths of the associated services to 0 and adjusts the bandwidth of the service 1 to the target bandwidth 100 M.

It should be noted that, when the sum of the remaining bandwidth and the protection bandwidths of the N+1 services is greater than the target bandwidth of the service 1, the node E may select a part of the associated services, and adjust the protection bandwidths of the part of the associated services to 0, or may adjust the bandwidths of all the associated services to 0, and then adjust the bandwidth of the service 1 to the target bandwidth. A specific processing manner is not limited in this embodiment of this application.

It should be further noted that, when the sum of the remaining bandwidth and the protection bandwidths of the N+1 services is less than the target bandwidth of the service 1, the node E does not perform processing. Alternatively, the node E sends activation failure information to the head node A.

Step 6:

After sending the control signaling that includes the bandwidth activation message and the APS message, the head node A performs fast switching of the local protection group, and switches the service from the working path to the protection path. The purpose of sending the control signaling before switching the local protection group is to ensure that the control signaling can be sent out smoothly. If the protection group is switched first, the bandwidth of the service flow is generally far greater than the protection bandwidth, and the control signaling cannot be sent out. In another aspect, it can be ensured that the control signaling is sent to the peer last node quickly for protection switching, so that the end-to-end service recovery speed is faster.

After receiving the OSU frame from the head node A, the last node B obtains a message type of the OSU frame, and then performs protection group switching based on the APS message carried in the OSU frame, to switch the service to the protection path.

Step 7:

If the head node detects that no alarm is generated in the end-to-end service state, the head node notifies the software RSVP that the service has been successfully switched to the protection path or notifies the PCE that the service has been successfully switched to the protection path. The software RSVP or the PCE performs end-to-end path takeover and unified maintenance and management, and updates that the working path of the service has been switched to the protection path (data on the data plane is consistent with that on the control plane).

The bandwidth activation process of the service in the protection path shown in FIG. 10 mainly includes the following three key points: (1) The virtual connection of the shared protection path is configured and established in an end-to-end manner. (2) After the OAM overhead fault is detected quickly, alarm information is reversely inserted into the OSU overhead and then transmitted to the head/last node, so that a bidirectional protection switching mechanism is established. (3) The OSU frame carries bandwidth activation and APS control signaling for end-to-end forwarding, and the transmission speed is fast. The intermediate node quickly activates the bandwidth and enables an end-to-end service. By using the head and last node protection switching mechanism and the end-to-end activation of the shared bandwidth, the shared protection path of the service can quickly take effect and the service performance can be recovered.

Figure 11:
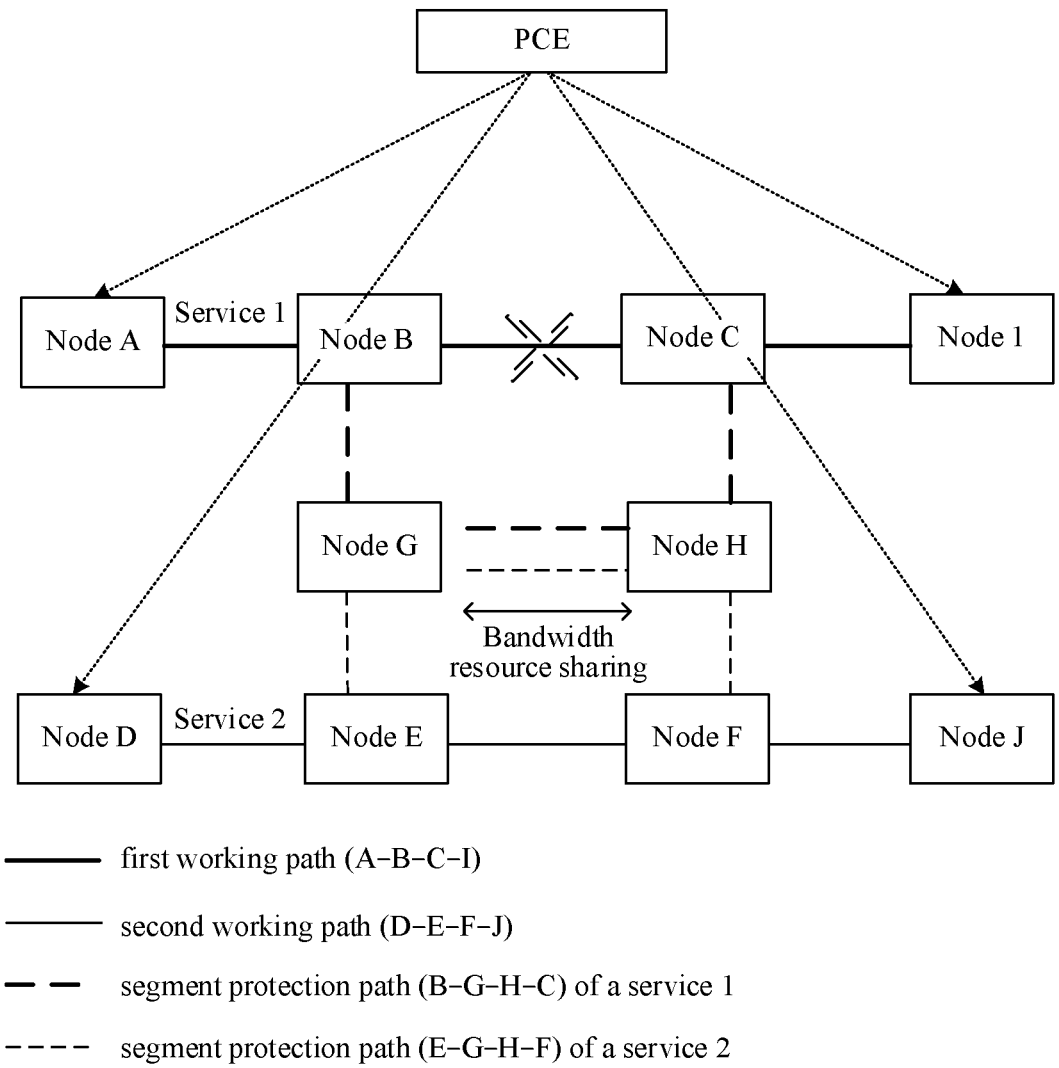
FIG. 11 is a diagram of another scenario to which a service protection method can be applied according to an embodiment of this application.

FIG. 11 is a diagram of an application scenario of another service protection method according to an embodiment of this application.

As shown in FIG. 11, an application network of this scenario is a GMPLS/ASON, which has an ASON automation function. The ASON shown in FIG. 11 has ten nodes: A, B, C, D, E, F, G, H, I and J. In this embodiment, the ASON function is enabled on the nodes A, B, C, D, E, F, G, H, I and J, the RSVP and a bandwidth activation apparatus are deployed on each node, and a protection group switching apparatus is further configured on head and last nodes of a service. Network information such as network-wide nodes and links is automatically obtained through the OSPF of the ASON protocol or an open shortest path first-traffic engineering (OSPF-TE). End-to-end service path provisioning and recovery are automatically established through the RSVP-TE of the ASON protocol. A PCE automatically obtains network-wide nodes, links, and service information based on the OSPF or a path computation element communication protocol (PCEP). The PCE mainly handles end-to-end path computation of network services, and can be deployed on a server network management system or similar devices. If no PCE is deployed in the network, an end-to-end path of a network service may be computed by each node in a distributed manner.

In this embodiment, shared protection for two services is taken as an example to describe FIG. 11.

In the scenario shown in FIG. 11, the service protection method provided in this embodiment of this application includes the following steps.

Step 1:

A service 1 has a first working path A-B-C-I, and a service 2 has a second working path C-E-F-J. After NCE provisions the service 1 and the service 2 of the shared protection type, the PCE obtains network-wide services and network topology, and computes protection paths for the service 1 and the service 2 based on different separation paths and shareable resource policies. The PCE determines a first protection path A-B-G-H-C-I of the service 1 and a second protection path D-E-G-H-F-J of the service 2, where G-H is a shared protection path segment, and the two services share a bandwidth of the protection path segment.

For a sharing situation in this embodiment, refer to the foregoing embodiment, and details are not described herein again.

Step 2:

The PCE delivers a protection path of each service to a head node of the service. As shown in FIG. 10, the PCE delivers the first protection path A-B-G-H-C-I to the node A, and delivers the second protection path D-E-G-H-F-J to the node D. In addition, delivered content may further include whether the first protection path and the second protection path share resources, a sharing degree, and a shared service group ID. The sharing degree indicates a quantity of services in the shared protection path segment. For example, in this embodiment, the service 1 (the protection path A-B-G-H-C-I) and the service 2 (the protection path D-E-G-H-F-J) share resources in the G-H segment, and the sharing degree is 2.

The PCE may deliver the protection path of the service to the service head nodes A and C through a PCEP protocol signaling message, or through a protocol message that has a same function as the PCEP. For a specific message type and format, refer to the foregoing embodiment, and details are not described herein again.

It should be noted that, the difference between this embodiment and the embodiment shown in FIG. 10 lies in that in FIG. 10, after a fault occurs on the working path of the service, the service is recovered from end to end; while in this embodiment, the service is recovered from a segment, that is, the node for protection switching is an intermediate node rather than the head node of the service. Therefore, the OSU frame channel associated signaling carrying the bandwidth activation message is generated and sent by a head node of a segment, and bandwidth activation is performed along the protection path segment. Therefore, in this embodiment, the head node may automatically generate a segment protection path based on the protection path delivered by the PCE. For example, the node A generates a segment protection path B-G-H-C, and the node D generates a segment protection path E-G-H-F.

Step 3:

After receiving the service protection path, the head node initiates establishment of a protection path virtual connection with bandwidth sharing. As shown in FIG. 11, the node A initiates signaling to establish a virtual connection of the protection path A-B-G-H-C-I, and the node D initiates signaling to establish a virtual connection of the protection path D-E-G-H-F-J. Specifically, the virtual connection establishment signaling sent by the node A and the node D may include the segment G-H being a virtual connection, whether to share, a sharing degree, and a shared service group ID.

The virtual connection establishment signaling sent by the head node to the downstream may be an RSVP-TE signaling message, or may be a protocol message that has the same function as the RSVP-TE. For example, the signaling message may be implemented through a new field (for example, an extended RSVP field) in original signaling between the first head node and the third node. For a format of the extended RSVP field, refer to the foregoing embodiment. Details are not described herein again.

For the intermediate nodes B, C, E, and F, as the head nodes or the last nodes of the protection segment, a protection group is directly established locally, so that when a fault occurs on the working path, the service is switched to the protection path through the protection group. Service data is single output and single input. Because the protection path is a virtual connection, the protection path is not used to transmit the service data.

After receiving the virtual connection establishment signaling, the intermediate nodes G and H learn that the signaling is establishment of a shared protection virtual connection, and the segment G-H is shared, and then locally establish a virtual cross-connection whose bandwidth is a protection bandwidth (for example, 2 M). A cross-connection of the service 1 is ingress port 1-channel 1-bandwidth 2 M, and egress port 1-channel 1-bandwidth 2 M; and a cross-connection of the service 2 is ingress port 2-channel 2-bandwidth 2 M, and egress port 2-channel 2-bandwidth 2 M. In addition, according to a resource sharing relationship (the sharing degree and the shared service group ID), a protection channel resource sharing relationship of the service 1 and the service 2 is stored in a local bandwidth activation unit. Target bandwidths of the service 1 and the service 2 are both 100 M.

It should be noted that, when there is no centralized PCE in the network, and a PCE exists in each node in a distributed manner, the head node A and the head node D may respectively configure protection path virtual connections B-G-H-C and E-G-H-F of the service through a PCEP message, that is, only segment protection configuration is required. For a specific manner, refer to the centralized processing manner in this embodiment, and details are not described herein again.

Step 4:

When a fault occurs between the nodes B and C, the head node A detects the fault on the working path of the service through the OAM overhead of the OSU frame. For a B-C unidirectional fault, after the node C perceives the fault, the bandwidth activation information may be carried in the OSU frame and a double-ended switching byte of the APS protocol may be added. Compared with the single APS overhead reverse insertion alarm to the peer node, the dual-ended switching is more efficient.

Step 5 to step 7 in the service protection in the scenario shown in FIG. 11 are the same as step 5 to step 7 in the scenario shown in FIG. 10, and details are not described herein again.

With reference to FIG. 6 to FIG. 11, the foregoing describes in detail the method for path configuration recovery provided in embodiments of this application. With reference to FIG. 12 to FIG. 15, the following describes in detail a service protection apparatus provided in embodiments of this application.

Figure 12:
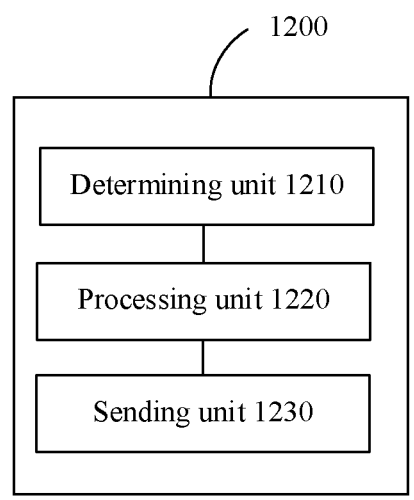
FIG. 12 is a schematic diagram of a structure of a service protection apparatus according to an embodiment of this application.

FIG. 12 is a schematic diagram of a service protection apparatus 1200 according to this application. As shown in FIG. 12, the apparatus 1200 includes a determining unit 1210, a processing unit 1220, and a sending unit 1230.

The determining unit 1210 is configured to determine that a fault occurs on a working path, for example, determine, by receiving a path fault message, that a fault occurs on the working path. The path fault message indicates that a fault occurs on the first working path between the first node and the second node.

The processing unit 1220 is configured to generate a bandwidth activation message based on the path fault message, where the bandwidth activation message indicates the third node to activate and configure the target bandwidth of the service.

For example, the processing unit is further configured to generate an APS message based on the fact that a fault occurs on the working path.

The sending unit 1230 is configured to send the bandwidth activation message. For example, the bandwidth activation message is inserted into an optical service unit OSU frame, and the OSU frame is sent on the first protection path.

The apparatus 1200 corresponds to the head node in the method embodiments, and may be specifically a service head node, or may be a protection segment head node. The corresponding units of the apparatus 1200 are configured to perform the corresponding steps performed by the head node in the method embodiments shown in FIG. 6 to FIG. 11.

The receiving unit 1210 and the sending unit 1230 may form a transceiver unit that has both receiving and sending functions. The processing unit 1220 may further include a fault information obtaining unit and a bandwidth activation message generating unit. The processing unit may be at least one processor. The sending unit 1230 may be a transmitter or an interface circuit, and the receiving unit 1210 may be a receiver or an interface circuit. The receiver and the transmitter may be integrated together to form a transceiver or an interface circuit.

Optionally, the apparatus 1200 may further include a storage unit, configured to store data and/or signaling. The receiving unit 1210, the processing unit 1220, and the sending unit 1230 may interact with or be coupled to the storage unit, for example, read or invoke the data and/or signaling in the storage unit, so that the method in the foregoing embodiments is performed.

The foregoing units may exist independently, or may be all or partially integrated.

Figure 13:
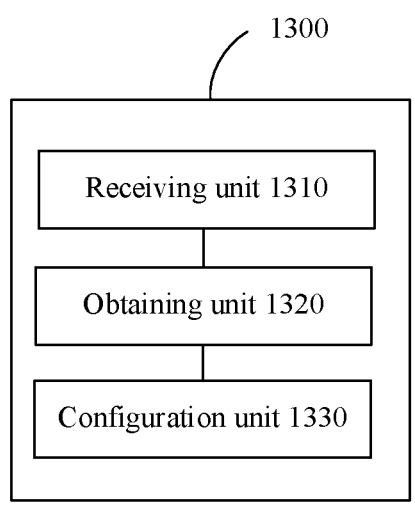
FIG. 13 is a schematic diagram of a structure of another service protection apparatus according to an embodiment of this application.

FIG. 13 is a schematic diagram of a service protection apparatus 1300 according to this application. As shown in FIG. 13, the apparatus 1300 includes a receiving unit 1310, an obtaining unit 1320, and a configuration unit 1330.

The receiving unit 1310 is configured to receive an OSU frame, where the OSU frame includes a bandwidth activation message, and the bandwidth activation message indicates to activate and configure a target bandwidth of a service.

The obtaining unit 1320 is configured to obtain the bandwidth activation message from the OSU frame.

The configuration unit 1330 is configured to activate and configure the target bandwidth of the service based on the bandwidth activation message.

The apparatus 1300 corresponds to the intermediate node in the method embodiments, and the apparatus 1300 may be the third node in the method embodiments, or a chip or a function module inside the node in the method embodiments. The corresponding units of the apparatus 1300 are configured to perform the corresponding steps performed by the intermediate node in the method embodiments shown in FIG. 6 to FIG. 11.

The receiving unit 1310 may have both receiving and sending functions. The configuration unit 1330 may be the bandwidth activation unit in FIG. 5, and is further configured to activate and configure the target bandwidth of the service. The receiving unit 1310 may be a receiver or an interface circuit. The receiver and the transmitter may be integrated together to form a transceiver or an interface circuit.

The foregoing units may exist independently, or may be all or partially integrated.

Figure 14:
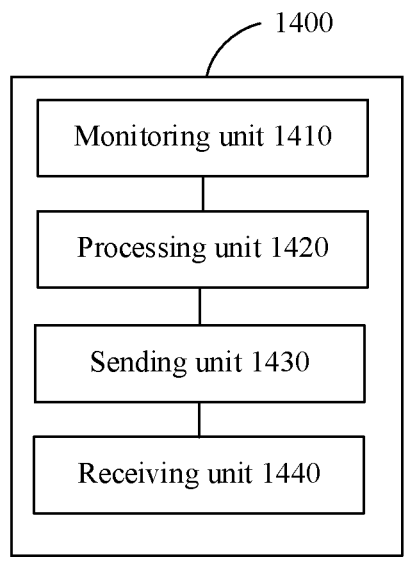
FIG. 14 is a schematic diagram of a structure of still another service protection apparatus according to an embodiment of this application.

FIG. 14 is a schematic diagram of a service protection apparatus 1400 according to an embodiment of this application. The apparatus 1400 includes a monitoring unit 1410, a processing unit 1420, a sending unit 1430, and a receiving unit 1440.

The monitoring unit 1410 is configured to monitor a fault that occurs on a first working path between nodes.

The processing unit 1420 is configured to generate a path fault message, where the path fault message indicates a head node to switch a service on the working path to a protection path.

The sending unit 1430 is configured to insert the path fault message into an OSU frame and send the OSU frame to the head node.

The foregoing units are all optional units. In addition, the apparatus 1400 further includes:

a receiving unit 1440, configured to receive the OSU frame from the head node, where the OSU frame includes an APS message, and the APS message indicates the current node to switch the service to the protection path.

The processing unit 1420 is further configured to switch the service to the protection path based on the APS message.

The processing unit 1420 may be at least one processor. The receiving unit 1440 and the sending unit 1430 may form a transceiver unit that has both receiving and sending functions. The sending unit 1430 may be a transmitter or an interface circuit, and the receiving unit 1440 may be a receiver or an interface circuit. The receiver and the transmitter may be integrated together to form a transceiver or an interface circuit.

Figure 15:
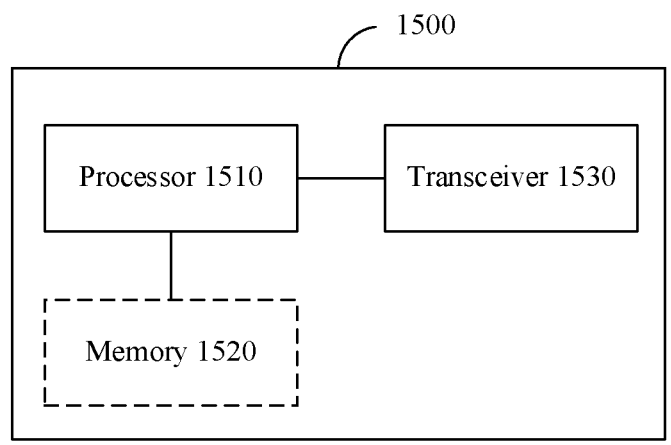
FIG. 15 is a schematic diagram of a structure of another service protection apparatus according to an embodiment of this application.

As shown in FIG. 15, FIG. 15 is a schematic diagram of a structure of a service protection apparatus 1500 according to this application. The apparatus 1500 includes a processor 1510, where the processor 1510 is coupled to a memory 1520. The memory 1520 may be configured to store a computer program or instructions and/or data, and the processor 1510 is configured to execute the computer program or the instructions and/or the data stored in the memory 1520, so that the method in the foregoing method embodiments is performed.

As shown in FIG. 15, the apparatus 1500 for path configuration recovery further includes a transceiver 1530, where the transceiver 1530 is configured to receive and/or send a signal. For example, the processor 1510 is configured to control the transceiver 1530 to receive and/or send a signal.

Optionally, the apparatus 1500 includes one or more processors 1510.

Optionally, as shown in FIG. 15, the apparatus 1500 further includes a memory 1520.

Optionally, the service protection apparatus 1500 may include one or more memories 1520.

Optionally, the memory 1520 may be integrated with or disposed separately from the processor 1510.

For example, the processor 1510 is configured to implement the related operations performed by the node, the processing unit, the obtaining unit, and the configuration unit in the foregoing method embodiments.

An embodiment of this application further provides a computer-readable storage medium, storing computer instructions for implementing the method performed by the head node or the intermediate node in the foregoing method embodiments.

An embodiment of this application further provides a computer program product. When the computer program is executed by a computer, the computer is enabled to implement the method performed by the head node in the foregoing method embodiments.

An embodiment of this application further provides a communication system. The communication system includes the network device and the node in the foregoing embodiments.

A person skilled in the art can appreciate that functions described with reference to various illustrative logical blocks, modules, and algorithm steps disclosed and described herein may be implemented by hardware, software, firmware, or any combination thereof. If implemented by software, the functions described with reference to the illustrative logical blocks, modules, and steps may be stored in or transmitted over a computer-readable medium as one or more instructions or code and executed by a hardware-based processing unit. A computer-readable storage medium corresponds to a tangible medium, for example, a data storage medium, or a communication medium that includes any medium (for example, according to a communication protocol) that facilitates transfer of a computer program from one place to another. A computer program product may include a computer-readable storage medium.

By way of example and not limitation, such computer-readable storage medium may include a RAM, a ROM, an EEPROM, a CD-ROM or another optical disc storage apparatus, a magnetic disk storage apparatus or another magnetic storage apparatus, a flash memory, or any other medium that can store required program code in the form of instructions or data structures and that can be accessed by a computer. In addition, any connection is properly referred to as a computer-readable medium.

An instruction may be executed by one or more processors such as one or more digital signal processors (DSP), a general microprocessor, an application-specific integrated circuit (ASIC), a field programmable gate array (FPGA), or an equivalent integrated circuit or discrete logic circuits. Therefore, the term "processor" used in this specification may refer to the foregoing structure, or any other structure that may be applied to implementation of the technologies described in this specification. In addition, the functions described in the various illustrative logical blocks, modules, and steps described herein may be provided within dedicated hardware and/or software modules configured for encoding and decoding, or may be incorporated into a combined codec. In addition, the technologies may be completely implemented in one or more circuits or logic elements.

The technologies in this application may be implemented in various apparatuses or devices, including an integrated circuit (IC) or a group of ICs (for example, a chip set). Various components, modules, or units are described in this application to emphasize functional aspects of the apparatus configured to perform the disclosed techniques, but do not necessarily require realization by different hardware units. Actually, as described above, various units may be combined into a codec hardware unit in combination with appropriate software and/or firmware, or may be provided by interoperable hardware units (including the one or more processors described above).

In addition, the term "and/or" in this application describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects. The term "at least one" in this application may represent "one" and "two or more". For example, at least one of A, B, and C may indicate the following seven cases: Only A exists, only B exists, only C exists, both A and B exist, both A and C exist, both C and B exist, and A, B, and C exist.

The foregoing descriptions are merely example specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
    determining, by a first node of an optical communication system, that a fault occurs on a first working path, wherein the optical communication system comprises the first node, a second node, and a third node, the first node is a common head node on the first working path and a first protection path, the second node is a common sink node on the first working path and the first protection path, the third node is any node other than the first node and the second node on the first protection path, the first working path is a current communication path of a service, and the first protection path is a standby path of the first working path;
    generating, by the first node, a bandwidth activation message based on that the fault occurs on the first working path, wherein the bandwidth activation message indicates to the third node to adjust a bandwidth of the service from a protection bandwidth to a target bandwidth, the protection bandwidth represents a pre-occupied bandwidth of the first protection path before transmission of the service, a cross-connection of the first protection path is established which pre-occupies the protection bandwidth before the transmission of the service fault occurs, the target bandwidth represents an actual occupied bandwidth of the first protection path for the transmission of the service, and the protection bandwidth is less than the target bandwidth; and
    sending, by the first node, the bandwidth activation message on the first protection path.

2. The method according to claim 1, wherein the sending, by the first node, the bandwidth activation message on the first protection path comprises:
    inserting, by the first node, the bandwidth activation message into a payload area of a first data frame; and
    sending, by the first node, the first data frame on the first protection path.

3. The method according to claim 2, wherein the payload area of the first data frame comprises a plurality of optical service units, each of the plurality of optical service units comprises a corresponding unit overhead area and a corresponding unit payload area, and the sending, by the first node, the bandwidth activation message on the first protection path comprises:
    inserting, by the first node, the bandwidth activation message into a unit payload area of one or more optical service units of the plurality of optical service units; and
    sending, by the first node, the first data frame on the first protection path.

4. The method according to claim 2, wherein the payload area of the first data frame further carries an automatic protection switching (APS) message, and the APS message indicates to the second node to switch the service to the first protection path.

5. The method according to claim 2, wherein the payload area of the first data frame further carries a message type, and the message type indicates that the first data frame carries the bandwidth activation message.

6. The method according to claim 2, wherein the payload area of the first data frame further carries a service identifier (ID) of the first protection path, and the third node determines, based on the service ID of the first protection path, another service that shares a bandwidth of the third node with the service.

7. The method according to claim 2, wherein a length of the first data frame is 192 bytes, 240 bytes, 128 bytes, or 64 bytes.

8. The method according to claim 1, wherein the method further comprises:
    after the first node sends the bandwidth activation message to the third node on the first protection path:
        adjusting, by the first node, the bandwidth of the service from the protection bandwidth to the target bandwidth; and
        switching, by the first node, the service to the first protection path.

9. The method according to claim 1, wherein the method further comprises:
    obtaining, by the first node, an ID of the service; and
    determining, by the first node, a service ID of the first protection path based on the ID of the service.

10. The method of claim 1, wherein the target bandwidth is based on a number of services sharing the bandwidth of the third node with the service.

11. A method, comprising:
    receiving, by a third node of an optical communication system, a first data frame, wherein the optical communication system comprises a first node, a second node, and the third node, the first node is a common head node on a first working path and a first protection path, the second node is a common sink node on the first working path and the first protection path, the third node is any node other than the first node and the second node on the first protection path, the first working path is a current communication path of a service, and the first protection path is a standby path of the first working path;
    obtaining, by the third node, a bandwidth activation message from the first data frame, wherein the bandwidth activation message indicates to the third node to adjust a bandwidth of the service from a protection bandwidth to a target bandwidth, the protection bandwidth represents a pre-occupied bandwidth of the first protection path before transmission of the service, a cross-connection of the first protection path is established which pre-occupies the protection bandwidth before the transmission of the service a fault occurs on the first working path, and the target bandwidth represents an actual occupied bandwidth for the transmission of the service; and
    adjusting, by the third node based on the bandwidth activation message, the bandwidth of the service from the protection bandwidth to the target bandwidth.

12. The method according to claim 11, wherein the bandwidth activation message is carried in a payload area of the first data frame.

13. The method according to claim 12, wherein the payload area of the first data frame comprises a plurality of optical service units, each of the plurality of optical service units comprises a corresponding unit overhead area and a corresponding unit payload area, and the bandwidth activation message is carried in a unit payload area of one or more optical service units of the plurality of optical service units.

14. The method according to claim 12, wherein the payload area of the first data frame further carries an automatic protection switching (APS) message, and the APS message indicates the second node to switch the service to the first protection path.

15. The method according to claim 12, wherein the payload area of the first data frame further carries a message type, and the message type indicates that the first data frame carries the bandwidth activation message.

16. The method according to claim 12, wherein the first data frame further carries a service identifier (ID) of the first protection path, and the third node determines, based on the service ID of the first protection path, another service that shares a bandwidth of the third node with the service.

17. The method according to claim 11, wherein a remaining bandwidth of the third node is less than the target bandwidth of the service, and the method further comprises:
   determining, by the third node based on a service ID of the first protection path, whether there is another service that shares a bandwidth of the third node with the service; and
   determining, by the third node based on a determining result of the determining that there is another service that shares the bandwidth of the third node with the service, whether to perform bandwidth adjustment.

18. The method according to claim 17, wherein the third node determines, based on the service ID of the first protection path, that there are N services that share the bandwidth of the third node with the service, and the method further comprises:
   determining, by the third node, that a sum of the remaining bandwidth and the protection bandwidth*(N+1) is greater than or equal to the target bandwidth, wherein N is greater than or equal to 1;
   obtaining, by the third node based on the service ID of the first protection path, IDs of other services of the N services that share the bandwidth of the third node with the service;
   adjusting, by the third node based on the IDs of the other services, a second protection bandwidth of at least one of the other services to 0, to release an idle bandwidth; and
   adjusting, by the third node based on the remaining bandwidth and the idle bandwidth, the bandwidth of the service from the protection bandwidth to the target bandwidth.

19. The method according to claim 11, wherein the receiving, by the third node, the first data frame comprises:
   receiving, by the third node, an OTN frame from the first node; and
   demapping the OTN frame to obtain the first data frame.

20. The method according to claim 11, wherein the method further comprises:
   before the adjusting, by the third node based on the bandwidth activation message, the bandwidth of the service from the protection bandwidth to the target bandwidth:
      forwarding, by the third node, the bandwidth activation message and an automatic protection switching (APS) message to a downstream node of the third node along the first protection path.

21. A first node, comprising:
   at least one processor; and
   a non-transitory computer readable storage medium storing instructions that, when executed by the at least one processor, cause the first node to perform operations including:
   determining that a fault occurs on a first working path, wherein an optical communication system comprises the first node, a second node, and a third node, the first node is a common head node on the first working path and a first protection path, the second node is a common sink node on the first working path and the first protection path, the third node is any node other than the first node and the second node on the first protection path, the first working path is a current communication path of a service, and the first protection path is a standby path of the first working path; and
   generating a bandwidth activation message based on that the fault occurs on the first working path, wherein the bandwidth activation message indicates to the third node to adjust a bandwidth of the service from a protection bandwidth to a target bandwidth, the protection bandwidth represents a pre-occupied bandwidth of the first protection path before transmission of the service, a cross-connection of the first protection path is established which pre-occupies the protection bandwidth before the transmission of the service fault occurs, the target bandwidth represents an actual occupied bandwidth for the transmission of the service, and the protection bandwidth is less than the target bandwidth; and
   sending the bandwidth activation message on the first protection path.

22. The first node according to claim 21, the operations further comprising:
   generating an automatic protection switching (APS) message based on that the fault occurs on the first working path.

23. The first node according to claim 22, the operations further comprising:
   inserting the bandwidth activation message and the APS message into a payload area of a first data frame; and
   sending the first data frame on the first protection path.

24. The first node according to claim 23, wherein a length of the first data frame is 192 bytes, 240 bytes, 128 bytes, or 64 bytes.

25. A third node, comprising:
   at least one processor; and
   a non-transitory computer readable storage medium storing instructions that, when executed by the at least one processor, cause the third node to perform operations including:
   receiving a first data frame, wherein an optical communication system comprises a first node, a second node, and the third node, the first node is a common head node on a first working path and a first protection path, the second node is a common sink node on the first working path and the first protection path, the third node is any node other than the first node and the second node on the first protection path, the first working path is a current communication path of a service, and the first protection path is a standby path of the first working path;
   obtaining a bandwidth activation message from the first data frame, wherein the bandwidth activation message indicates to the third node to adjust a bandwidth of the service from a protection bandwidth to a target bandwidth, the protection bandwidth represents a pre-occupied bandwidth of the first protection path before transmission of the service, a cross-connection of the first protection path is established which pre-occupies the protection bandwidth before the transmission of the service a fault occurs on the first working path, and the target bandwidth represents an actual occupied bandwidth for the transmission of the service; and
   adjusting, based on the bandwidth activation message, the bandwidth of the service from the protection bandwidth to the target bandwidth.

26. The third node according to claim 25, wherein a length of the first data frame is 192 bytes, 240 bytes, 128 bytes, or 64 bytes.

27. The third node according to claim 25, wherein a payload area of the first data frame comprises a plurality of optical service units, each of the plurality of optical service units comprises a corresponding unit overhead area and a corresponding unit payload area, and the bandwidth activation message is located in a unit payload area of one or more optical service units of the plurality of optical service units.

28. The third node according to claim 27, wherein the payload area of the first data frame further carries an automatic protection switching (APS) message, and the APS message indicates to the second node to switch the service to the first protection path.

29. The third node according to claim 27, wherein the payload area of the first data frame further carries a service ID of the first protection path, and the third node determines, based on the service ID of the first protection path, another service that shares a bandwidth of the third node with the service.

30. The third node according to claim 29, wherein a remaining bandwidth of the third node is less than the target bandwidth of the service, the operations further comprising:
   determining, based on the service ID of the first protection path of the service, whether there is another service that shares the bandwidth of the third node with the service; and
   determining, based on a determining result of the determining that there is another service that shares the bandwidth of the third node with the service, whether to perform bandwidth adjustment.

31. The third node according to claim 30, wherein the third node determines, based on the service ID of the first protection path, that there are N services that share the bandwidth of the third node with the service, the operations further comprising:
   determining that a sum of the remaining bandwidth and the protection bandwidth*(N+1) is greater than or equal to the target bandwidth, wherein N is greater than or equal to 1;
   obtaining, based on the service ID of the first protection path of the service, IDs of other services of the N services that share the bandwidth of the third node with the service;
   adjusting, based on the IDs of the other services, a second protection bandwidth of at least one of the other services to 0, to release an idle bandwidth; and
   adjusting, based on the remaining bandwidth and the idle bandwidth, the bandwidth of the service from the protection bandwidth to the target bandwidth.

* * * * *